(12) United States Patent
DeMartinis et al.

(10) Patent No.: US 10,197,373 B2
(45) Date of Patent: Feb. 5, 2019

(54) MARKING DEVICE FOR ATTACHING TO A TAPE MEASURE

(71) Applicant: Catalyst Innovations Corp., Bethpage, NY (US)

(72) Inventors: John Anthony DeMartinis, Bethpage, NY (US); Anthony Louis DeMartinis, Bethpage, NY (US); Steven Joseph Bofill, New Rochelle, NY (US); Martin Adámek, Klimkovice (CZ)

( * ) Notice: Subject to any disclaimer, the term of this patent is extended or adjusted under 35 U.S.C. 154(b) by 137 days.

(21) Appl. No.: 15/456,733

(22) Filed: Mar. 13, 2017

(65) Prior Publication Data

US 2017/0261301 A1  Sep. 14, 2017

Related U.S. Application Data

(60) Provisional application No. 62/306,862, filed on Mar. 11, 2016.

(51) Int. Cl.
   *G01B 3/10* (2006.01)

(52) U.S. Cl.
   CPC .... *G01B 3/1084* (2013.01); *G01B 2003/1089* (2013.01)

(58) Field of Classification Search
   CPC .................................................. G01B 3/1084
   USPC .................................. 33/759, 760, 768, 770
   See application file for complete search history.

(56) References Cited

U.S. PATENT DOCUMENTS

| | | |
|---|---|---|
| 1,394,992 A | 10/1921 | Fry |
| 2,026,768 A | 1/1936 | Aronson |
| 2,847,765 A | 8/1958 | Bateman |
| 3,802,083 A * | 4/1974 | Freed ........................ B25H 7/04 33/668 |
| 3,871,100 A | 3/1975 | Hildebrandt |
| 4,015,337 A | 4/1977 | Taylor |
| 4,189,844 A | 2/1980 | Riggins, Sr. |
| 4,507,869 A | 4/1985 | Stude |
| 4,630,376 A | 12/1986 | Pentecost |
| 4,667,412 A * | 5/1987 | Carlson ................ G01B 3/1084 33/666 |
| 4,890,393 A | 1/1990 | St. Jean |

(Continued)

FOREIGN PATENT DOCUMENTS

EP       0013683 A1     8/1980

*Primary Examiner* — G. Bradley Bennett
(74) *Attorney, Agent, or Firm* — Carter, DeLuca, Farrell & Schmidt, LLP; George Likourezos, Esq.

(57) ABSTRACT

A marking device for attaching to a tape measure includes an attachment assembly for movably attaching the marking device to a tape measure and a guide housing movably engageable with the attachment assembly. The guide housing receives a marking member and a marking fluid storage member and directs movement of the marking member from a first position contacting the marking fluid storage member to a second position contacting an object to be marked. A compartment receives the guide housing, which directs movement of the marking member from the second position to the first position. At least one aperture enables contact of the marking member with an object to be marked. An energy storage member moves the guide housing and marking member from the first position to the second position. The guide housing may include a gear mechanism that moves the marking member from the first position to the second position.

28 Claims, 21 Drawing Sheets

(56) References Cited

U.S. PATENT DOCUMENTS

| | | |
|---|---|---|
| 4,965,941 A | 10/1990 | Agostinacci |
| 4,999,924 A | 3/1991 | Shields |
| D320,168 S | 9/1991 | Archer |
| 5,172,486 A | 12/1992 | Waldherr |
| 5,671,543 A | 9/1997 | Sears |
| 5,815,939 A | 10/1998 | Ruffer |
| 5,992,038 A | 11/1999 | Harmon et al. |
| 6,178,655 B1 | 1/2001 | Potter et al. |
| 6,487,783 B1 | 12/2002 | Thomas, Jr. |
| 6,497,050 B1 | 12/2002 | Ricalde |
| 6,574,881 B2 * | 6/2003 | Cole, III ............ B43L 9/04 33/27.032 |
| 6,637,125 B2 * | 10/2003 | Scarborough ....... G01B 3/1041 33/42 |
| 6,663,153 B2 | 12/2003 | Brunson |
| 6,678,961 B1 | 1/2004 | Panahi |
| 6,698,104 B2 | 3/2004 | Scarborough |
| D488,729 S | 4/2004 | Golaszewski et al. |
| 6,804,898 B1 | 10/2004 | Hsu |
| 6,839,981 B2 | 1/2005 | Rafter |
| 6,892,469 B2 | 5/2005 | Tufts et al. |
| 6,941,672 B2 * | 9/2005 | Scarborough ....... G01B 3/1041 33/42 |
| 6,948,257 B1 | 9/2005 | Barr, Jr. |
| 6,996,915 B2 | 2/2006 | Ricalde |
| 7,028,411 B1 | 4/2006 | Kasche |
| 7,086,174 B2 | 8/2006 | Scarborough |
| 7,269,913 B2 | 9/2007 | Holevas |
| D632,987 S | 2/2011 | Wilson et al. |
| 7,900,370 B1 | 3/2011 | Treige |
| 7,908,754 B2 | 3/2011 | Fritsch |
| 8,196,308 B1 | 6/2012 | Baldi, Jr. |
| 8,522,447 B1 | 9/2013 | Novotny |
| 9,335,142 B2 | 5/2016 | DeMartinis et al. |
| 2001/0034953 A1 | 11/2001 | Cole |
| 2002/0011006 A1 * | 1/2002 | Smith ............... G01B 3/1084 33/668 |
| 2002/0088135 A1 * | 7/2002 | Arlinsky ........... G01B 3/1041 33/760 |
| 2006/0112583 A1 | 6/2006 | Sullivan |
| 2006/0288599 A1 | 12/2006 | Hajianpour |
| 2008/0098610 A1 | 5/2008 | Lipps |
| 2009/0090017 A1 | 4/2009 | Smiroldo |
| 2009/0307920 A1 * | 12/2009 | Schrage ............. G01B 3/1041 33/760 |
| 2010/0000102 A1 | 1/2010 | Contreras |
| 2012/0036727 A1 | 2/2012 | McCarthy |
| 2012/0055038 A1 | 3/2012 | Lindsay |
| 2014/0317943 A1 | 10/2014 | DeMartinis et al. |
| 2015/0052771 A1 | 2/2015 | Mamatkhan et al. |
| 2015/0075022 A1 | 3/2015 | Bitton et al. |
| 2016/0178338 A1 * | 6/2016 | Webb ............... G01B 3/1084 33/701 |
| 2017/0322008 A1 * | 11/2017 | Schneider ......... G01B 3/1084 |

\* cited by examiner

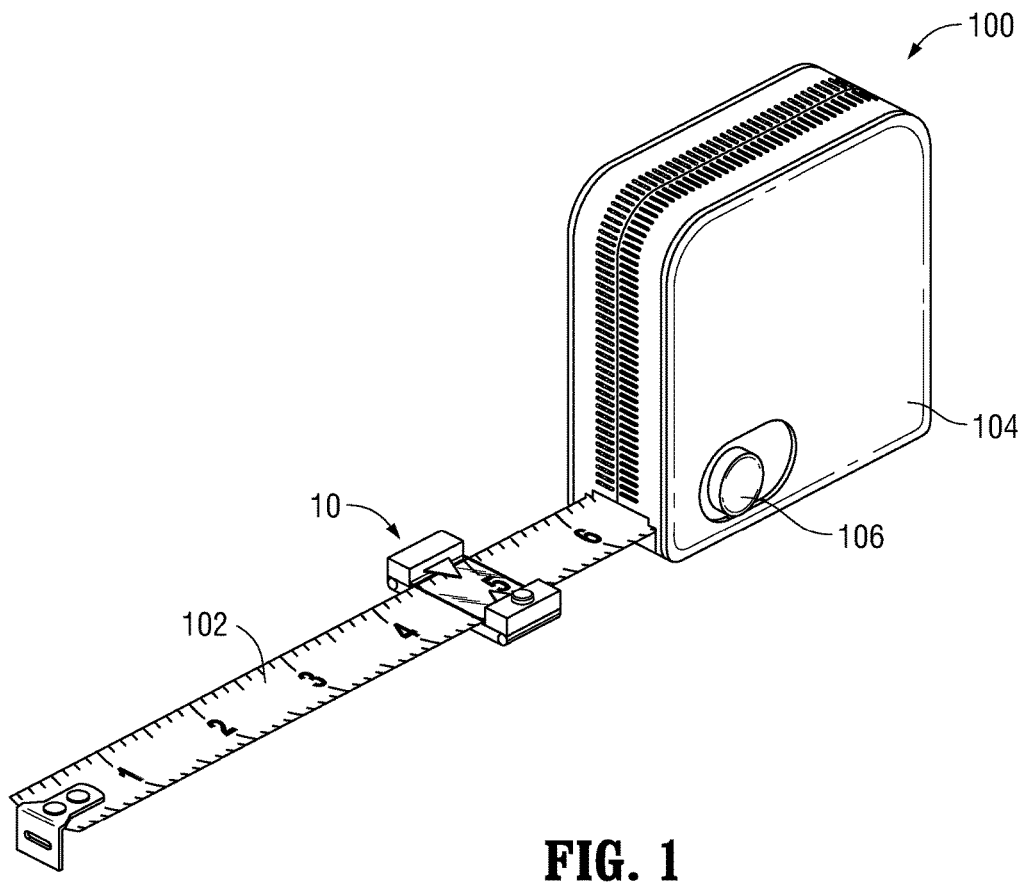
FIG. 1
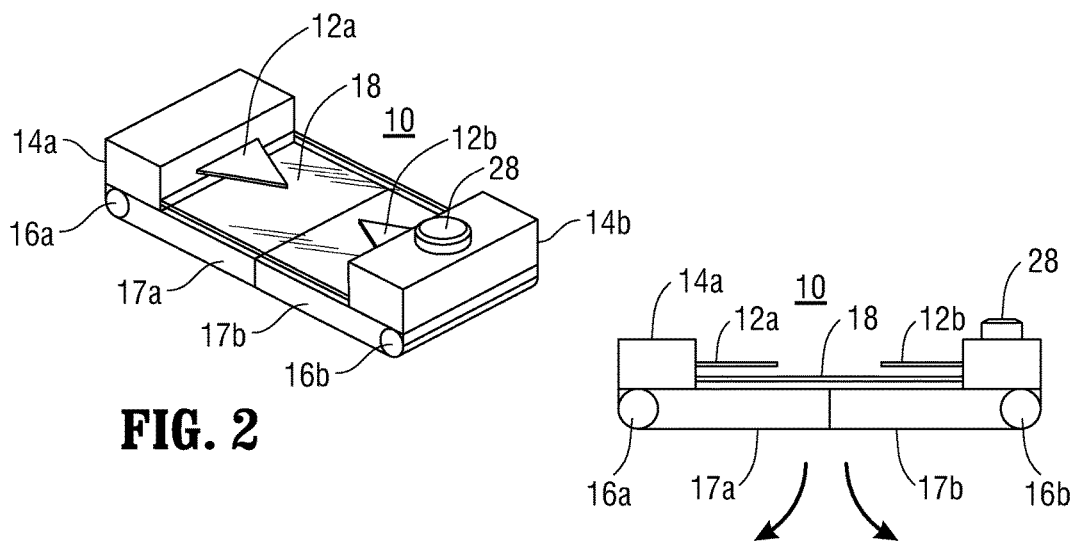
FIG. 2
FIG. 3

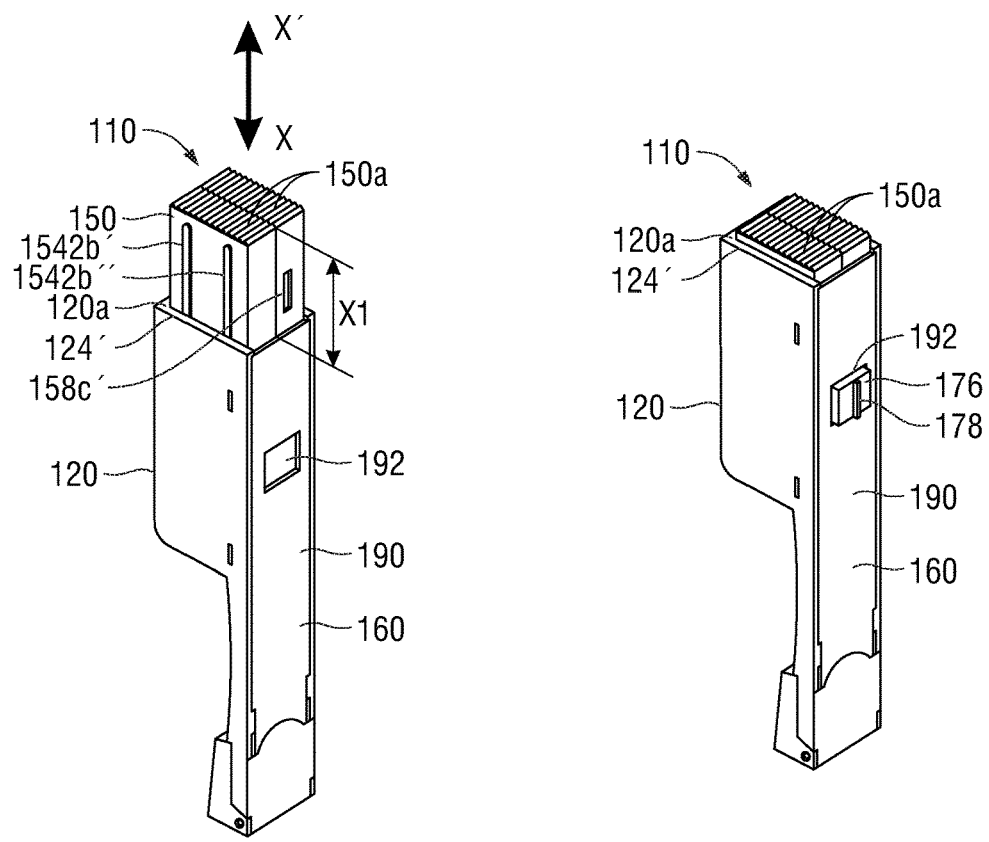
FIG. 10
FIG. 11
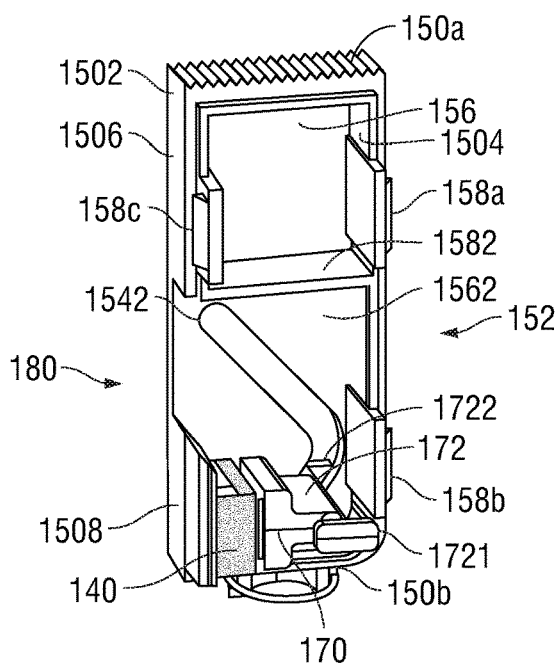
FIG. 12

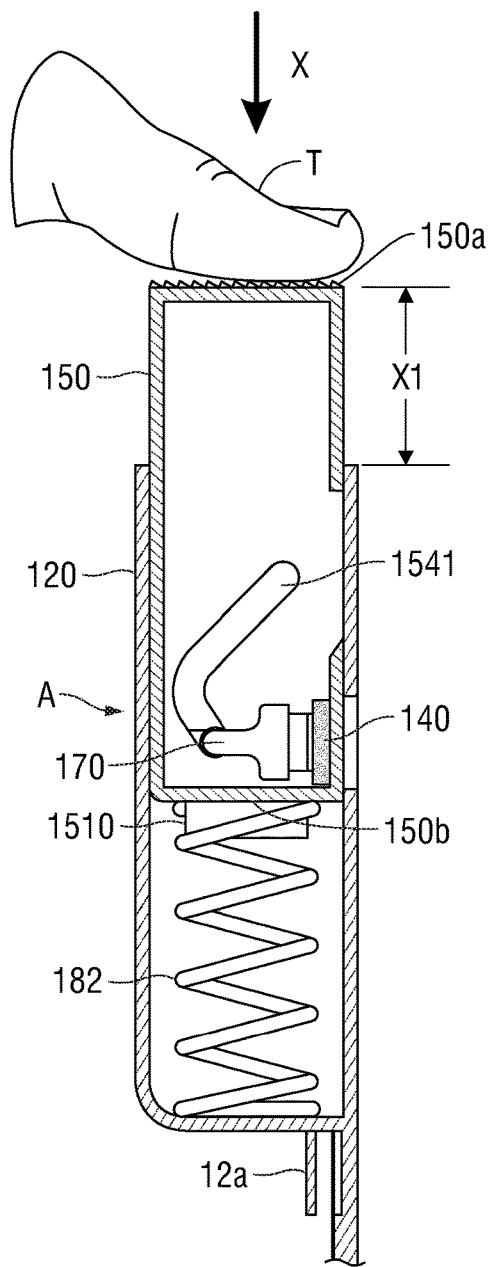
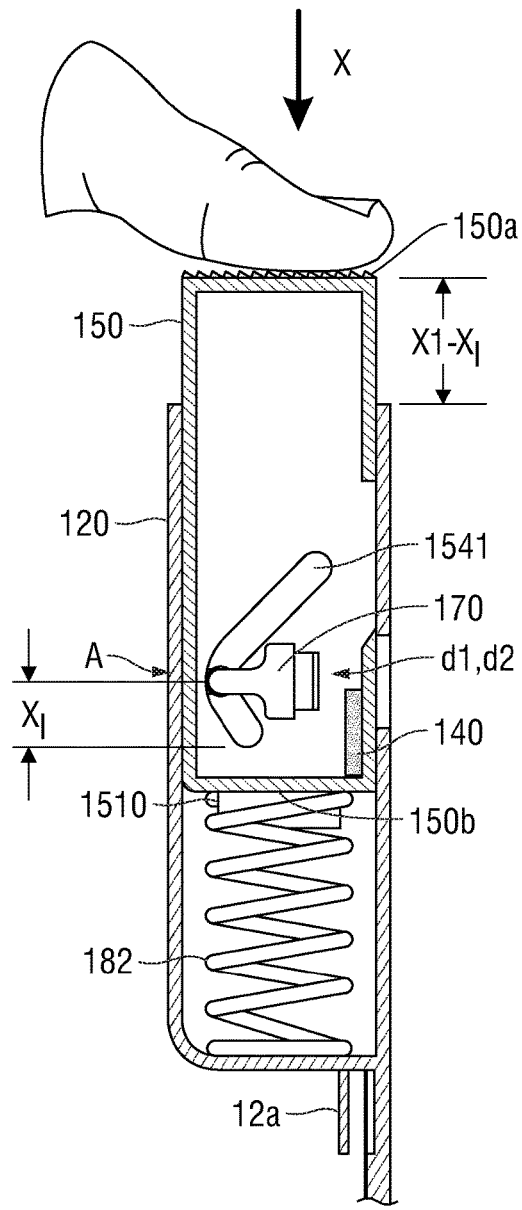
FIG. 13A  FIG. 13B

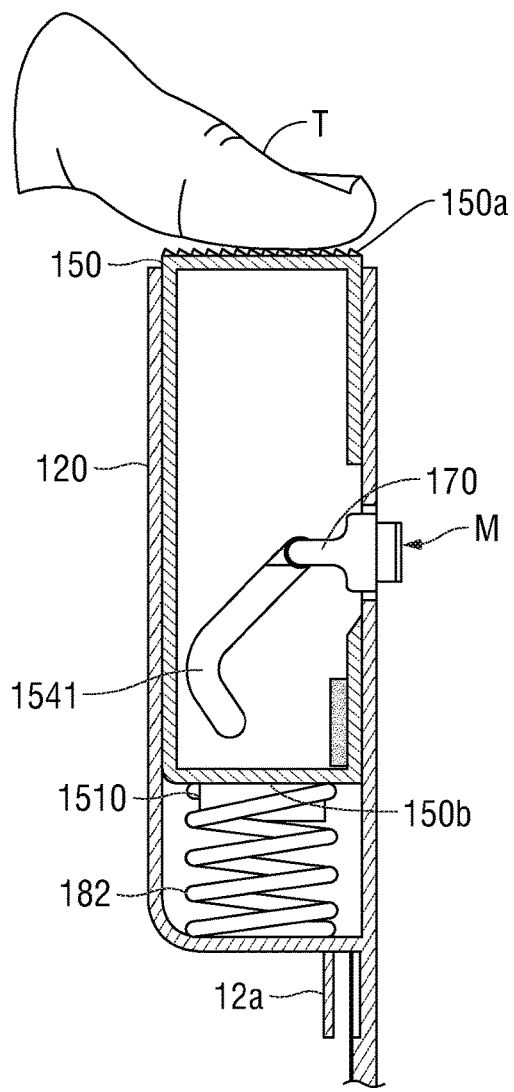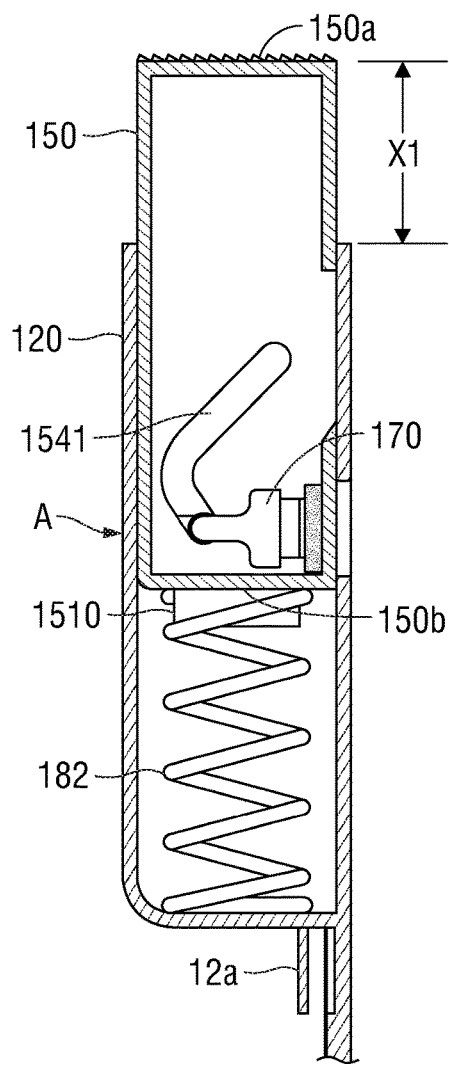
FIG. 13C  FIG. 13D

MARKING DEVICE FOR ATTACHING TO A TAPE MEASURE

PRIORITY AND CROSS-REFERENCE TO RELATED APPLICATIONS

This application relates to U.S. patent application Ser. No. 13/871,262 filed on Apr. 26, 2013, entitled "MARKING DEVICE FOR ATTACHING TO A TAPE MEASURE", by J. DeMartinis et al., now U.S. Pat. No. 9,335,142 B2, the entire contents of which are incorporated by reference herein. This application claims priority to, and the benefit of, U.S. Provisional Patent Application Ser. No. 62/306,862 filed on Mar. 11, 2016, entitled "MARKING DEVICE FOR ATTACHING TO A TAPE MEASURE", by J. DeMartinis et al., the entire contents of which are incorporated by reference herein.

BACKGROUND

1. Technical Field

The present disclosure relates generally to measuring devices; specifically, to a marking device for attaching to a tape measure.

2. Description of Related Art

Standard tape measuring devices are generally comprised of a span of ductile metal tape which is imprinted with either U.S. standard or metric units of measure of length and coiled around a housing-encased spool. A user retracts the tape from the housing, places the tape against a surface and measures out a desired span across the surface. It is often important for skilled craftsmen and the like to mark the surface at various specific and precisely measured distances.

SUMMARY

Embodiments of a marking device are disclosed and described herein enable a user of a tape measure to make precise marks upon a measured surface without marring the surface or requiring the user to access an independent marking instrument. The marking device of the various embodiments is configured for attaching to a tape measure, such as a tape measure which recoils within a housing. The marking device according to the various embodiments of the present disclosure is self-contained. The term "self-contained" is defined herein to mean that the marking device includes an attachment mechanism for attaching to the tape measure and also a marking mechanism for marking a surface.

In one embodiment, the marking mechanism includes ink for marking the surface, whereas in another, alternate embodiment, the marking mechanism includes a scraper or other type of structure for marking the surface without the use of a chemical. For example, the scraper can scrape, indent, etc. the surface when the scraper is compressed against the surface.

When attached to the tape measure, the marking device is configured to slide along the tape measure when a force is applied thereto. At least one pointer is provided to indicate or point to a measurement along the tape measure. When the marking mechanism of the marking device is actuated to mark the surface, the surface is marked at a location which coincides with the measurement pointed to by the at least one pointer.

More specifically, in one particular aspect of the present disclosure, there is provided a marking device for attaching to a tape measure. The marking device includes an attachment assembly for movably attaching the marking device to a tape measure and a guide housing movably engageable with the attachment assembly. The guide housing is configured and disposed to receive a marking member and a marking fluid storage member and is configured to direct movement of the marking member from a first position enabling contact with the marking fluid storage member to a second position that enables contact with an object to be marked.

In embodiments, the attachment assembly may include a compartment that defines an internal volume that is configured and disposed to receive the guide housing. The guide housing may be configured to direct movement of the marking member from the second position to the first position.

In embodiments, the guide housing may include at least one aperture defined therein to direct movement of the marking member from the first position to the second position.

In embodiments, the at least one aperture defined in the guide housing may be configured and disposed to enable engagement with the marking member and movement of the marking member therein from the first position to the second position.

In embodiments, the guide housing may define at least one aperture therein that is configured and disposed to enable contact of the marking member with an object to be marked.

In embodiments, an energy storage member may be configured and disposed in the attachment assembly to allow movement of the guide housing such that the marking member is enabled to move from the first position to the second position. The energy storage member may include a spring disposed in the attachment member and in operable communication with the guide housing.

In embodiments, the guide housing may include a gear mechanism configured and disposed to effect movement of the marking member from the first position to the second position.

In still other embodiments, the guide housing may define an aperture configured and disposed to interface with the gear mechanism such that movement of the guide housing by a user of the marking device enables movement of the marking member from the first position and through the aperture to the second position.

In embodiments, the gear mechanism may include rack and pinion configured and disposed to effect movement of the marking member from the first position to the second position.

In embodiments, the guide housing may be configured in a separable two section configuration wherein one section defines an aperture or both sections define an aperture configured to receive the marking member to direct movement of the marking member from the first position to the second position.

In embodiments, each section may be configured to receive therein the marking fluid storage member.

In embodiments, the apertures defined in each section may be configured to receive the marking member to direct in tandem movement of the marking member from the first position to the second position.

In still other embodiments, the attachment assembly may include a panel member that defines an aperture configured and disposed to enable the marking member to contact an object to be marked when the marking member is in the second position that enables contact with an object to be marked.

In embodiments, the attachment assembly may define an internal volume configured to receive the guide housing therein.

In embodiments, the attachment assembly may include at least one guide member configured and disposed within the internal volume to engage with the marking member to maintain orientation of the marking member as the marking member travels from the first position enabling contact with the marking fluid storage member to the second position that enables contact with an object to be marked.

In embodiments, the attachment assembly may define an internal volume configured to receive the guide housing therein and wherein the panel member engages with the attachment assembly to at least partially seal the internal volume.

In embodiments, the guide housing may be actuated via an energy storage member configured and disposed to effect movement of the marking member from the second position to the first position and the internal volume may extend laterally away from the tape measure a distance sufficient to enable the guide housing to be moved laterally towards and away from the tape measure by a user depressing the guide housing into the internal volume such that the energy storage member reverses movement of the guide housing out of the internal volume when the user releases the guide housing.

In embodiments, the guide housing may be actuated via an energy storage member configured and disposed to effect movement of the marking member from the second position to the first position and upon a user depressing the guide housing into the internal volume, the energy storage member reverses movement of the guide housing out of the internal volume when the user releases the guide housing.

In embodiments, the attachment assembly may include a tape measure supporting plate projecting from the attachment assembly and at least one projecting member extending from the attachment assembly and positioned with respect to the tape measure supporting plate to define a gap between the tape measure supporting plate and the at least one projecting member; and a projecting member support member including at least one projecting member extending from the projecting member support member towards the attachment assembly and positioned with respect to the tape measure supporting plate to define a gap between the tape measure supporting plate and the at least one projecting member. The tape measure supporting plate may project from the attachment assembly to define a distance between the attachment assembly and the projecting member support member that enables insertion of a tape measure therebetween.

In embodiments, the attachment assembly may define an end wall and at least one sidewall, the attachment assembly that includes a tape measure supporting plate projecting from one of the end wall or from one of the one or more sidewalls of the attachment assembly.

In embodiments, the tape measure supporting plate may project from the end wall and the tape measure supporting plate may be removable from the end wall.

In embodiments, the tape measure supporting plate may project from one of the one or more sidewalls and the tape measure supporting plate may be removable from the one of the one or more sidewalls.

In embodiments, the projecting member support member may be pivotally joined to the tape measure supporting plate.

In embodiments, the projecting member support member may be configured and disposed to pivot from a first position that enables insertion of the tape measure on the tape measure supporting plate to a second position that defines the gap between the tape measure supporting plate and the at least one projecting member. In another aspect, the present disclosure relates to a marking device configured to attach to a tape measure. The marking device includes an attachment assembly for movably attaching the marking device to a tape measure and a guide housing movably engageable with the attachment assembly. The guide housing is configured to receive a marking member and a marking fluid storage member. The guide housing is configured and disposed to direct movement of the marking member from a first position enabling contact with the marking fluid storage member to a second position that enables contact with an object to be marked.

In embodiments, the guide housing may be actuated via an energy storage member configured and disposed to effect movement of the marking member from the second position to the first position.

In yet another aspect, the present disclosure relates to a marking device configured to attach to a tape measure wherein the marking device includes an attachment assembly for movably attaching the marking device to a tape measure and a guide housing movably engageable with the attachment assembly. The guide housing is configured to receive a marking member and a marking fluid storage member. The guide housing is configured and disposed to direct movement of the marking member from a first position enabling contact with the marking fluid storage member to a second position that enables contact with an object to be marked. The guide housing includes a gear mechanism configured and disposed to effect movement of the marking member from the first position to the second position.

In still another aspect, the present disclosure relates to a marking device configured to attach to a tape measure. The marking device includes an attachment assembly for movably attaching the marking device to a tape measure; a guide housing movably engageable with the attachment assembly. The guide housing is configured to receive a marking member and a marking fluid storage member. The guide housing configured and disposed to direct movement of the marking member from a first position enabling contact with the marking fluid storage member to a second position that enables contact with an object to be marked; and a tape measure supporting plate projecting from the attachment assembly. The tape measure supporting plate is removable from the attachment assembly.

In embodiments, the guide housing may be actuated via an energy storage member configured and disposed to effect movement of the marking member from the second position to the first position.

In yet another aspect, the present disclosure relates to a marking device configured to attach to a tape measure. The marking device includes an attachment assembly for movably attaching the marking device to a tape measure; and a guide housing movably engageable with the attachment assembly. The guide housing is configured to receive a marking member and a marking fluid storage member. The guide housing is configured and disposed to direct movement of the marking member from a first position enabling contact with the marking fluid storage member to a second position that enables contact with an object to be marked. The attachment assembly defines an end wall and at least one sidewall. The attachment assembly includes a tape measure supporting plate projecting from the end wall or from one the sidewalls of the attachment assembly.

BRIEF DESCRIPTION OF THE DRAWINGS

The advantages and features of the present disclosure will become more appreciated and better understood when considered in conjunction with the drawings:

FIG. 1 is a perspective view of a tape measure device showing an embodiment of the present disclosure attached to a measuring tape;

FIG. 2 is a top-side perspective view of an embodiment of the present disclosure in the closed position;

FIG. 3 is partial side view of an embodiment of the present disclosure in the closed position;

FIG. 10 is a perspective view of the marking device of FIGS. 7-9B in the resting position, with the marking device unactuated and the marking member unexposed;

FIG. 11 is a perspective view of the marking device of FIGS. 7-9B in a depressed position, with the marking device actuated and the marking member exposed;

FIG. 12 is a cross-sectional, side partial view of the marking device of FIGS. 7-11 with the marking member in the marking fluid storage member contacting position;

FIG. 13A is a cross-sectional, side view of the marking device of FIGS. 7-12 in the resting position, with the marking member in the marking fluid storage member contacting position;

FIG. 13B is a cross-sectional, side view of the marking device of FIGS. 7-13A in a depressed position, with the marking member in an intermediate position between the marking fluid storage member contacting position and the marking position enabling contact with an object to be marked;

FIG. 13C is a cross-sectional, side view of the marking device of FIGS. 7-13B in a depressed position, with the marking member in the marking position enabling contact with an object to be marked;

FIG. 13D is a cross-sectional, side view of the marking device of FIGS. 7-13C wherein the marking device has been returned to the resting position, with the marking member in the marking fluid storage member contacting position;

DETAILED DESCRIPTION

Figure 4:
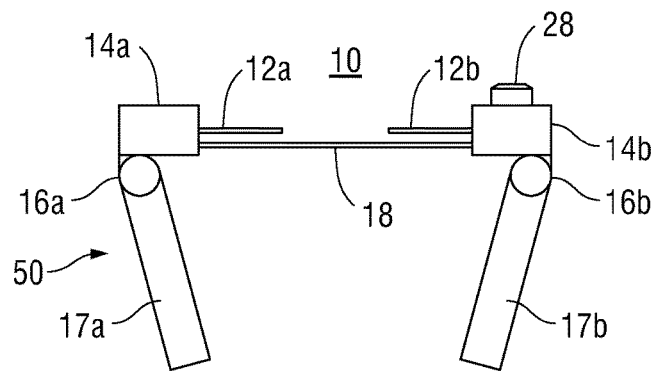
FIG. 4 is partial side view of an embodiment of the present disclosure in the open position.

In the Summary and Brief Description of the Drawings sections above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility). The term "at least" herein means one or more than one.

FIG. 1 illustrates an exemplary tape measure 100 that includes measuring tape 102, housing 104, lock button 106, and an embodiment of the presently disclosed marking device 10 coupled or attached to measuring tape 102. In FIG. 1, the measuring tape 102 is shown extending from the tape measure 100. It is appreciated that other types of measuring tapes can be used in conjunction with marking device 10, such as a tailor's measuring tape which does not include a housing.

Marking device 10 is self-contained in that it includes structure for enabling the device 10 to be attached to a tape measure and it also includes structure for enabling the device to be used to mark a surface. The structure used to mark the surface, such as ink or other chemicals, scraper, etc., is enclosed within the marking device 10 as described herein. One of ordinary skill in the art can also appreciate within the spirit of the present disclosure that the structure used to mark the surface does not have to be enclosed within the marking device 10.

FIGS. 2 and 3 illustrate an embodiment of marking device 10, showing a set of triangulated pointers 12a and 12b attached, respectively, to the inside wall of guide rails or members 14a and 14b so as to have the narrow end of pointer 12a directed toward, and in the opposite direction of, the narrow end of pointer 12b. Guide rails 14a and 14b are connected to each other via transparent viewing plate 18 located underneath pointers 12a and 12b. Flaps or movable members 17a and 17b are connected to the underside walls of guide rails 14a and 14b, respectively, at hinges 16a and 16b, respectively.

Marking actuator 28 is located atop the outside top wall of the guide rail 14b and retained or held in position by the guide rail 14b.

FIG. 4 illustrates an embodiment of marking device 10, showing flaps 17a and 17b in the open position. Flaps 17a and 17b come together in the closed position by the use of manual force and will remain as such until manual force is exerted to separate flaps 17a and 17b from each other, thereby putting them in the open position. In the closed position, flaps 17a and 17b come together directly below, and parallel to, viewing plate 18 so as to leave just enough space between the viewing plate 18 and flaps 17a and 17b to allow a measuring tape 102 to slide perpendicularly through such space when a manual force is applied to device 10, while simultaneously allowing device 10 to remain friction fit against measuring tape 102 when no manual force is applied.

The guide rails 14a, 14b, flaps 17a, 17b, plate 18 are part of an attachment mechanism 50 for attaching the marking device 10 to the tape measure 102.

Figure 5A:
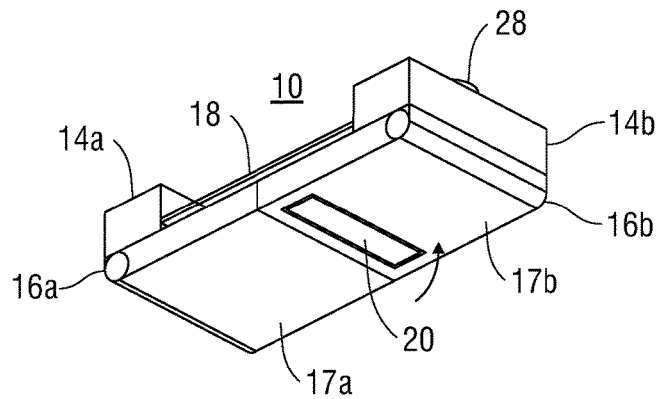
FIG. 5A is a bottom-side perspective view of an embodiment of the present disclosure in the closed position, with the marker unactuated.
Figure 5B:
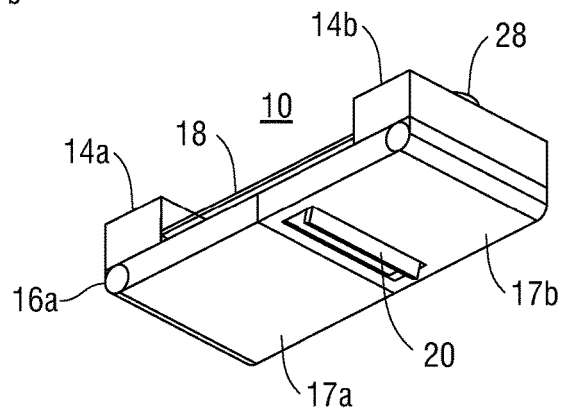
FIG. 5B is a bottom-side perspective view of an embodiment of the present disclosure in the closed position, with the marker actuated and unexposed.
Figure 5C:
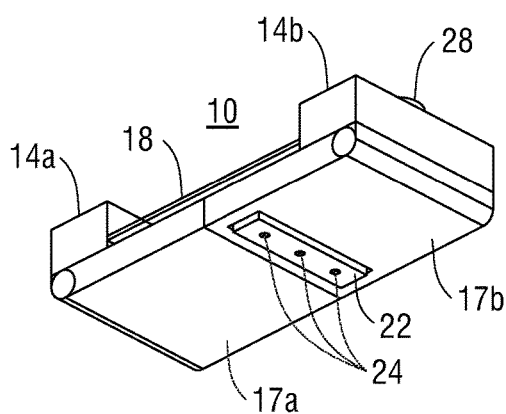
FIG. 5C is a bottom-side perspective view of an embodiment of the present disclosure in the closed position, with the marker actuated and exposed.

FIGS. 5A, 5B and 5C illustrate an embodiment of marking assembly 22 of marking mechanism 30 of device 10.

FIG. 5A shows the underside wall of flap 17b having trap door 20 in the closed position and covering marking assembly 22 from exposure when actuator 28 has not been depressed.

FIG. 5B shows the underside wall of flap 17b having trap door 20 in the open position and exposing marking assembly 22 when actuator 28 has been partially depressed. As shown by the depiction of marking mechanism 30 in FIGS. 6A and 6B, depressing actuator 28 forces marking assembly 22 to project downward against the inside wall of trap door 20. Turning back to FIG. 5B, trap door 20 gives way to the force exerted by marking assembly 22 when actuator 28 is partially depressed by beginning to slide up and into the inner side wall of compartment 38 housing marking assembly 22 inside flap 17b.

FIG. 5C shows the underside wall of flap 17b having marking assembly 22 exposed when actuator 28 has been fully depressed. Trap door 20 gives way to the force exerted upon its inside wall by marking assembly 22 when actuator 28 is fully depressed by sliding up entirely into the inner side wall of compartment 38. Simultaneously, the bottom portion of marking assembly 22 protrudes outward from the underside of flap 17b while exposing marking point 24.

Figure 6A:
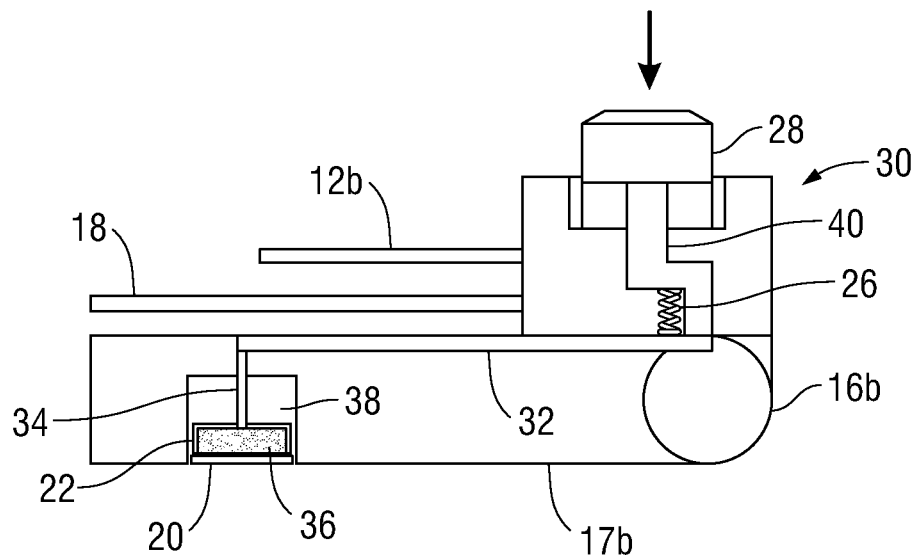
FIG. 6A is a cross-sectional, partial side view of an embodiment of the present disclosure in the closed position, with the marker unactuated.
Figure 6B:
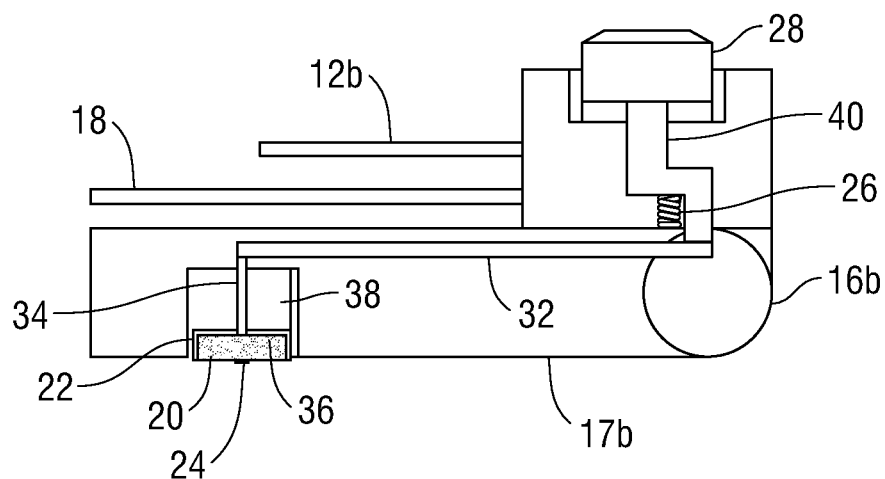
FIG. 6B is a cross-sectional, partial side view of an embodiment of the present disclosure in the closed position, with the marker actuated.

FIGS. 6A and 6B illustrate an embodiment of the marking mechanism 30 of device 10.

FIG. 6A shows mechanism 30 when actuator 28 has not been depressed. Protruding below the base of actuator 28 is "Z"-shaped actuating member 40 integral with the lever 32. Actuating member 40 descends vertically from the base of actuator 28 within guide rail 14b before, first, shifting horizontally therein and, then, shifting back down vertically where actuating member 40 contacts one end of lever 32. Bias spring 26 is enclosed between the horizontal shift portion of actuating member 40 and lever 32. Lever 32 runs in the horizontal direction parallel with flap 17b, is housed just inside the topside wall of flap 17b, and is connected to actuating member 40 on one end and to cross-bar 34 on the opposite end. Cross-bar 34 extends vertically from the opposite end of lever 32 to the top-center of marking assembly 22. In this state, marking assembly 22 is housed entirely inside compartment 38 of flap 17b, whereas marking point 24 is unexposed and covered by trap door 20.

FIG. 6B shows mechanism 30 when actuator 28 has been depressed. Actuating member 40 is forced down upon one end of lever 32 which causes cross-bar 34 to compress down upon marking assembly 22. When the underside of device 10, and, by implication, the underside of flap 17b, is pressed up against a surface (not shown) and actuator 28 is fully depressed, marking assembly 22 is forced out of compartment 38 inside flap 17b and becomes compressed against the surface.

The compression of marking assembly 22 against the surface consequently compresses ink pad 36 located within marking assembly 22, resulting in a marking agent (not shown) to be excreted out from ink pad 36 via marking point 24. Thereby, a mark is placed upon the surface at a point corresponding to a precise unit of measure identified on measuring tape 102 between pointers 12a and 12b. Spring 26 is bias in such a way that, when actuator 28 is released, spring 26 will recoil back to the position it was in prior to actuator 28 being depressed, thereby returning mechanism 30 to the state described in FIG. 6A.

In an alternate embodiment, marking assembly 22 is a scraper configured to scrape or leave an indent on a surface for marking the surface when compressed against the surface. Accordingly, this embodiment does not include ink pad 36.

FIGS. 7-13D illustrate an alternate embodiment of a marking device according to the present disclosure wherein, in a similar manner as described above with respect to marking device 10 above, marking device 110 is also configured to attach to measuring tape 102 of tape measure 100. However, the marking device 110 now includes an attachment assembly 120 for movably attaching the marking device 110 to measuring tape 102 of tape measure 100. The marking device 110 further includes a guide housing 150 that is movably engageable with the attachment assembly 120. The attachment assembly 120 includes a compartment 122 that defines an internal volume 124 that is configured to receive the guide housing 150. The guide housing 150 defines a proximal end 150a and a distal end 150b.

The attachment assembly 120 includes a tape measure supporting plate 160 projecting externally away from a distal end wall 126 of the compartment 122 and at least one projecting member 12a extending from the distal end wall 126 of the compartment 122 and positioned with respect to the tape measure supporting plate 160 to define a first gap G1 between the tape measure supporting plate 160 and the projecting member 12a. The attachment assembly 120 further includes a projecting member support member 162 positioned on upper surface 160a of the tape measure supporting plate 160 and which includes at least one projecting member 12b extending from the projecting member support member 162 towards the compartment end wall 126 and positioned with respect to the tape measure supporting plate 160 to define a second gap G2 between the tape measure supporting plate 160 and the projecting member 12b.

The tape measure supporting plate 160 may project from the distal end wall 126 of the compartment 122 to define a distance D between the distal end wall 126 of the compartment 122 and the projecting member support member 162 that enables insertion of tape measure 102 therebetween.

In embodiments, the projecting member support member 162 may be pivotally joined via a pivot connection 164 to the tape measure supporting plate 160. The projecting member support member 162 is configured and disposed to pivot from a first or raised position that enables insertion of the tape measure 102 on the tape measure supporting plate 160 (see FIG. 8B—tape measure 102 not shown) to a second or lowered position that defines the gap G2 between the tape measure supporting plate 160 and the projecting member 12b (see FIGS. 7 and 8A).

Figure 8A:
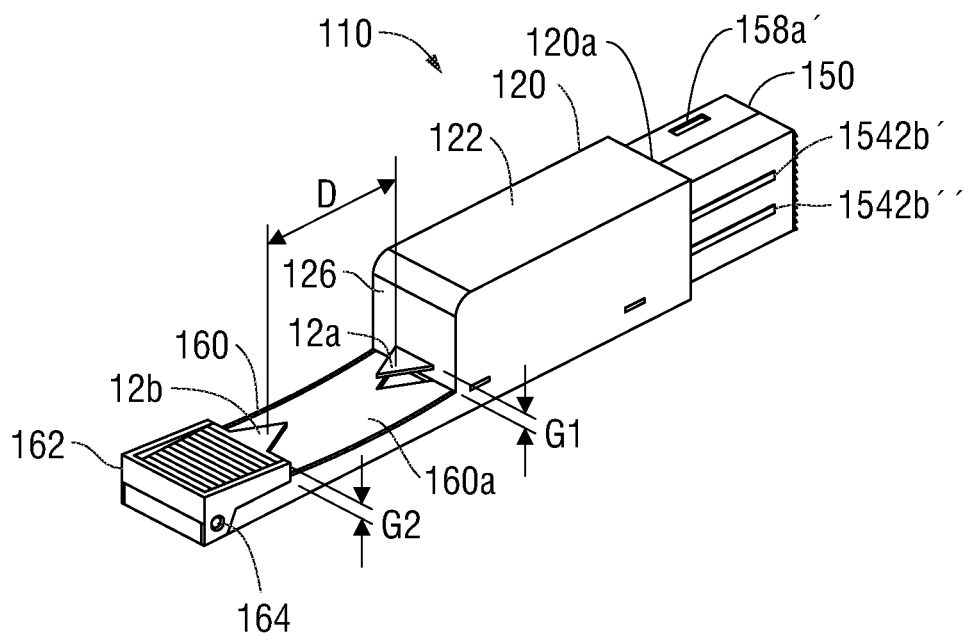
FIG. 8A is a perspective view of the tape measure marking device of FIG. 7 without grasping a tape measure.
Figure 8B:
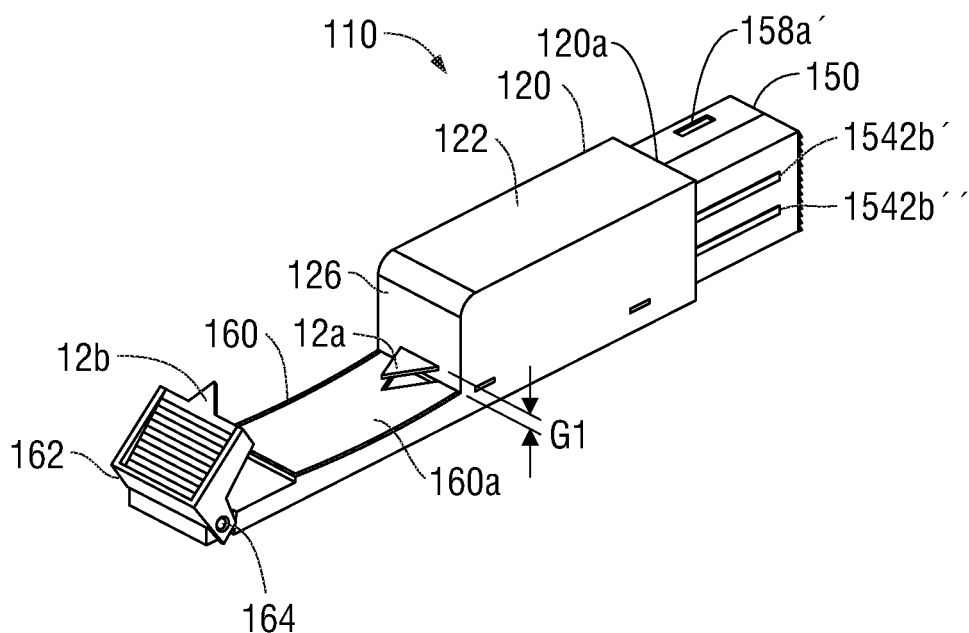
FIG. 8B is a perspective of the tape measure marking device of FIG. 8A in a configuration to enable grasping a tape measure.

As best shown in FIGS. 8A and 8B, to facilitate support of the tape measure 102 by the tape measure supporting plate 160, the tape measure supporting plate 160 may have a contoured shape that generally aligns with the contoured cross-section of tape measure 102. To facilitate manufacturing of the marking device 110, a cavity 166 may be defined in the tape measure supporting plate 160 directly beneath the projecting member 12a and, in embodiments, in the same shape and orientation as the projecting member 12a, e.g., in the form of a triangle, and aligned therewith. The presence of the cavity 166 enables manufacturing of the marking device 110 via a two-piece mold.

To also facilitate support of the tape measure 102, the tape measure supporting plate 160 may include gripping pads 1681 and 1682, shown for example as rectangular strips in parallel to each other on either side of projecting member 12b (see FIG. 8B).

In embodiments, turning now to FIGS. 9A and 9B and 10-12, the guide housing 150 may be configured to receive a marking member 170 (see FIG. 9A) and a marking fluid storage member 140 (see FIG. 12). The guide housing 150 defines a marking member actuation cavity 152 therewithin that receives the marking member 170.

The guide housing 150 includes guide structure 180 that is configured to direct movement of the marking member 170 within the marking member actuation cavity 152 from a first position enabling contact with the marking fluid storage member 140 to a second position that enables contact with an object to be marked (not shown).

The attachment assembly 120 includes at least one guide member 128a disposed along first lateral internal wall 1301, wherein a second guide member 128b is also disposed in parallel to guide member 128a along first lateral internal wall 1301 to define a gap g1 between the first and second guide members 128a and 128b.

Similarly, the attachment assembly 120 may also include at least one guide member 128c disposed along second lateral internal wall 1302, wherein a second guide member 128d is also disposed in parallel to guide member 128c along second lateral internal wall 1302 to define a gap g2 between the first and second guide members 128c and 128d.

Figure 9A:
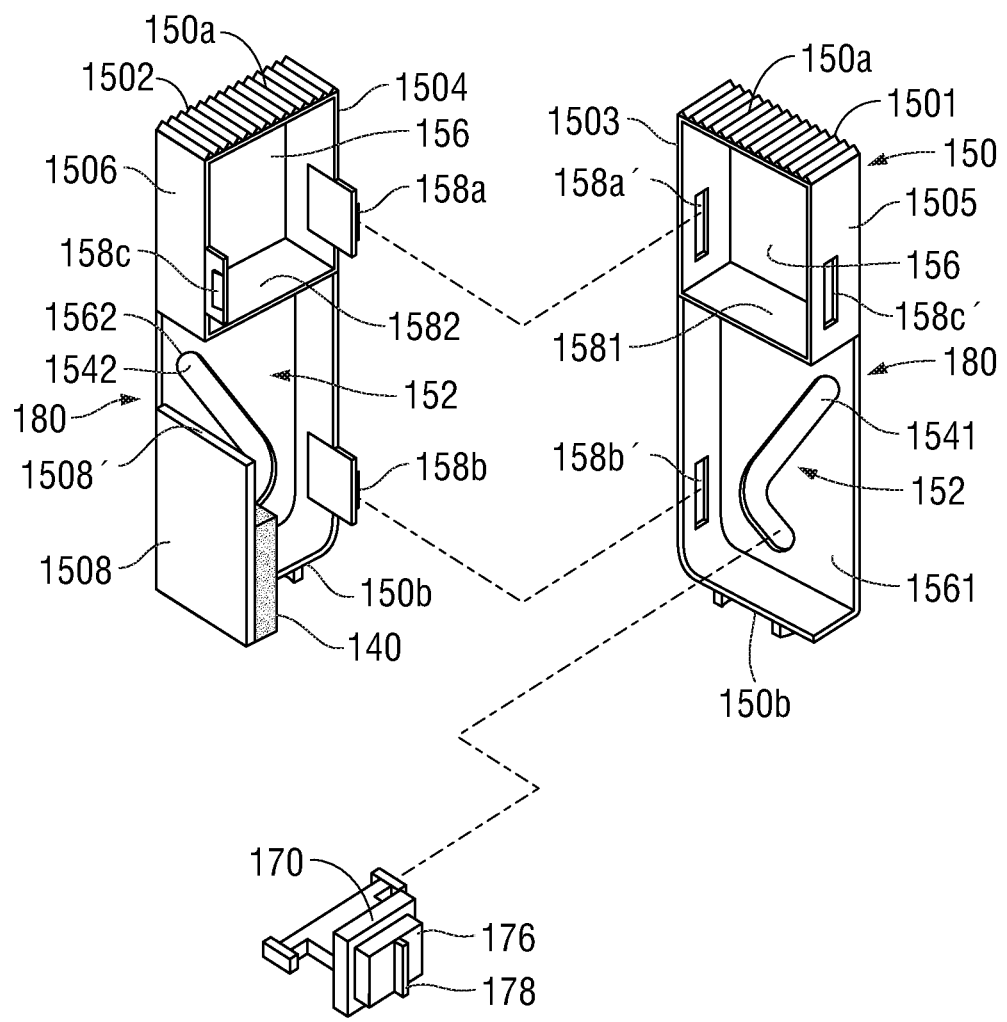
FIG. 9A is a perspective exploded view of a guide housing of the marking device of FIGS. 7 and 8.

Referring to FIGS. 9A and 12, the marking member 170 includes a T-shaped plate member 172 that is bounded on either side of the arms of the T-shape with guidance projection members 1721 and 1722. Guidance projection members 1721 and 1722 define a width dimension w1 and w2, respectively. The base 174 of the T-shaped plate member 172 is configured and disposed to interface with the marking fluid storage member 140 which is also received in the marking member actuation cavity 152.

The guide housing 150 includes guide structure 180 that is configured to direct movement of the marking member 170 within the marking member actuation cavity 152 from a marking fluid storage member contacting position A enabling contact with the marking fluid storage member 140 to apply marking fluid to stamping surface 176 that includes a marking applicator 178 (see FIGS. 12 and 13A) to a marking position M (see FIG. 13C) that enables contact by the marking applicator 178 with an object to be marked (not shown). It should be noted that marking applicator 178 is oriented in a direction to align with a straight line formed between projecting members 12a and 12b so that the mark provided by marking applicator 178 coincides with the tape measure measurement desired by a user (see FIG. 7).

The guide housing 150 is configured in a separable two section configuration wherein one section 1501 defines a marking member movement direction aperture 1541 or both sections 1501 and 1502 define marking member movement direction apertures 1541 and 1542, respectively, that are configured to receive the marking member 170 to direct movement of the marking member 170 from the marking fluid storage member contacting position A to the marking position M. The sections 1501 and 1502 are formed so that when joined together, section walls 1561 and 1562 define the marking member actuation cavity 152 that is on the distal side of the guide housing 150. A second or proximal hinge receiving cavity 156, that is adjacent and proximally positioned with respect to, the marking member actuation cavity 152, is also defined by the sections 1501 and 1502 when joined together.

The second section 1502 further includes a marking fluid storage member support base 1508 that partially extends along and partially bounds the marking member actuation cavity 152.

A distal hinge 158b and a proximal hinge 158a are configured and disposed on upper wall 1504 of the section 1502 and within the marking member actuation cavity 152 and the second or proximal hinge receiving cavity 156, respectively. Similarly, a proximal hinge 158c is configured and disposed on lower wall 1506 of the section 1502 within the proximal hinge receiving cavity 156. When the sections 1501 and 1502 are joined together, to provide stability to the guide housing 150, the proximal hinge 158a and the distal hinge 158b engage in proximal hinge receiving aperture 158a' and in distal hinge receiving aperture 158b', respectively, that are formed in upper wall 1503 of the section 1501. Similarly, the proximal hinge 158c engages in proximal hinge receiving aperture 158c' that is formed in lower wall 1505 of section 1501. The proximal hinge 158a and the distal hinge 158b are disposed within the portions of the upper wall 1503 that confine the second or proximal hinge receiving cavity 156 and the marking member actuation cavity 152, respectively, while the proximal hinge 158c is disposed within the portion of the lower wall 1505 that confines the second or proximal hinge receiving cavity 156. The second or proximal hinge receiving cavity 156 is separated from the marking member actuation cavity 152 via interior wall 1581 disposed in first section 1501 and via interior wall 1582 disposed in second section 1502.

Further, when sections 1501 and 1502 are joined together, the marking fluid storage member support base 1508 extends across the marking member actuation cavity 152 from an edge of section wall 1562 of the second section 1502 to an edge of section wall 1561 of the first section 1501.

Figure 9B:
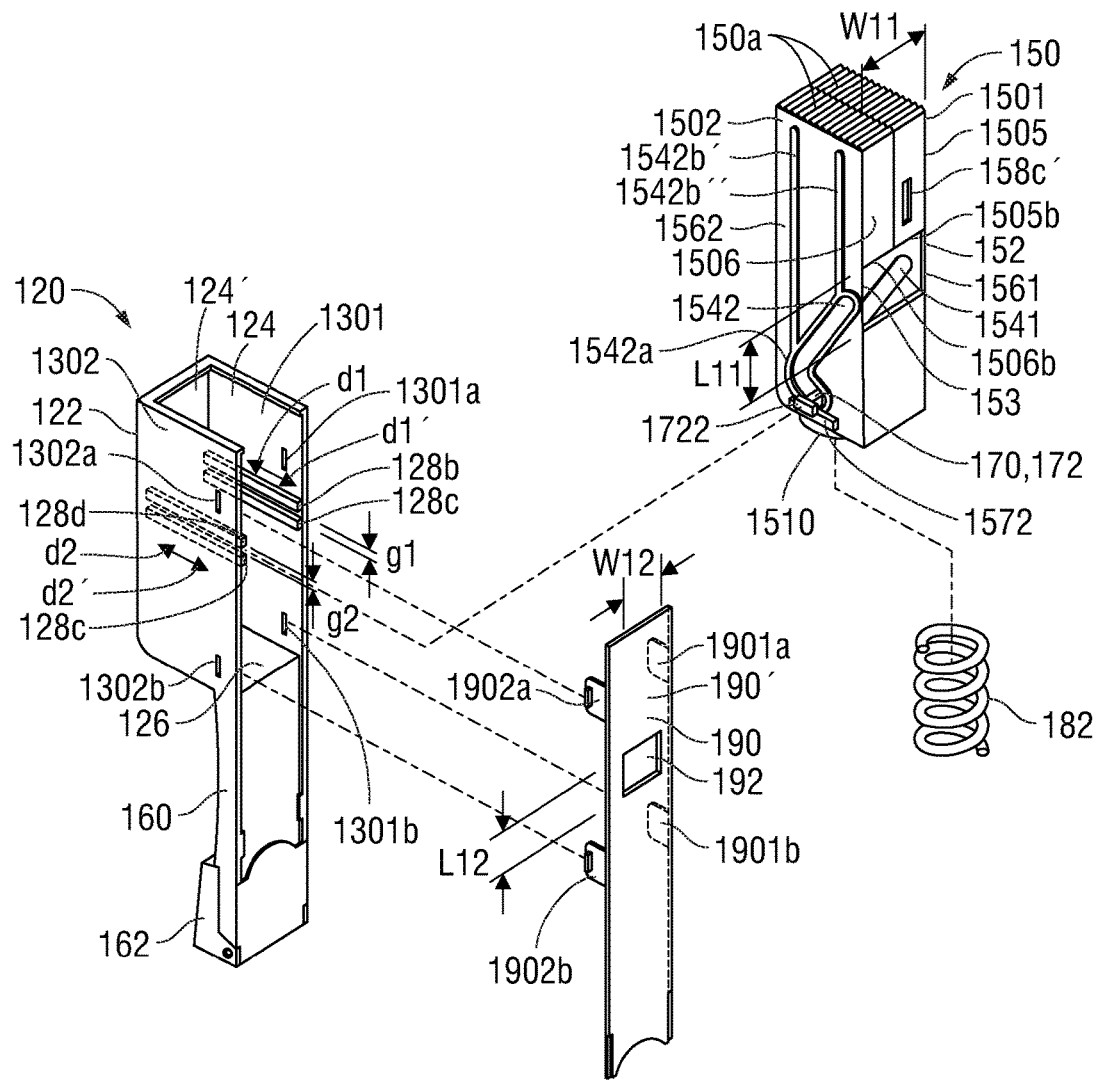
FIG. 9B is a perspective exploded view of an attachment assembly of the marking device of FIGS. 7 and 8 with the guide housing of FIG. 9A.

In the example embodiment of FIGS. 9A and 9B, the marking member movement direction apertures 1541 and 1542 are J-shaped apertures defined in section walls 1561 and 1562, respectively. Each section 1501 and 1502 may be configured to receive therein the marking fluid storage member 140. The apertures 1541 and 1542 are each configured and disposed to receive therethrough the guidance projection members 1721 and 1722 so as to direct in tandem movement of the marking member 170 from the marking fluid storage member contacting position A to the marking position M, thereby enabling engagement with the marking member 170 and movement of the marking member 170 therein from position A to position M, (see FIGS. 13A-13D), thereby forming a part of the guide structure 180. During travel of the marking member 170 from position A to position M, the marking member 170 may also assume intermediate positions such as position I at the apex of the J-shaped aperture as shown in FIG. 13B.

The guidance projection members 1721 and 1722 of the marking member 170 are configured and disposed through the apertures 1541 and 1542 respectively so that the guidance projection member 1721 having a width dimension w1 becomes engaged in the gap g1 between the guide members 128a and 128b disposed along first lateral internal wall 1301 and the guidance projection member 1722 having a width dimension w2 becomes engaged in the gap g2 between the guide members 128c and 128d disposed along second lateral internal wall 1302. The width dimensions w1 and w2 are selected to be less than or equal to the gaps g1 and g2, respectively, to allow the marking member 170 to move freely and securely in either direction defined by the guide members 128a, 128b and 128c, 128d, as shown by the double arrows d1-d1' and d2-d2', respectively.

Thus, guidance projection members 1721 and 1722 engage with the guide members 128a, 128b and 128c, 128d, respectively, to reversibly travel in the paths defined by the guide members 128a, 128b and 128c, 128d to maintain orientation of the marking member 170 as the marking member 170 travels from the marking fluid storage member contacting position A, including the intermediate positions such as I, to the marking position M enabling contact with an object to be marked. Contact with an object to be marked is enabled via a guide housing marking member access aperture 153 at marking position M that is defined by the guide housing 150 when the sections 1501 and 1502 are joined together. The guide housing marking member access aperture 153 is partially bounded by distal end 1505b of lower wall 1505 and partially bounded by distal end 1506b of lower wall 1506, the lower walls 1505 and 1506 each partially bounding the hinge receiving cavity 156. The aperture 153 is also partially bounded by first section wall 1561 and by second section wall 1562 in opposition to one another. Further, the aperture 153 is bounded by a proximal edge 1508' of marking fluid storage member support base 1508.

Figure 7:
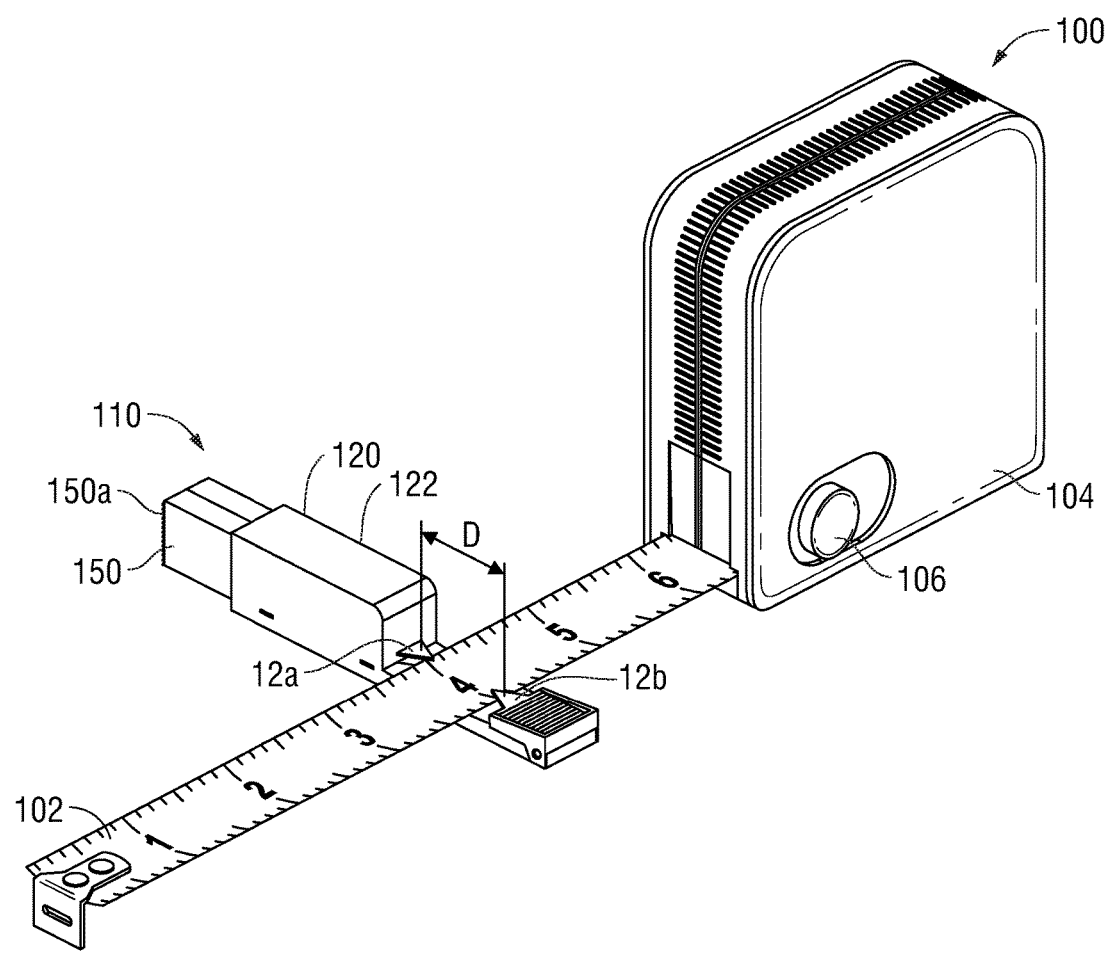
FIG. 7 is a perspective view of another embodiment of a tape measure marking device attached to a measuring tape according to the present disclosure.

In the example of FIGS. 9A and 9B, the guide housing marking member access aperture 153 is rectangularly shaped and defines a width W11 equal to the width of the two sections 1501 and 1502 and a length L11 in the direction of length of the attachment assembly 120 as shown by the double arrow X-X' (see FIG. 10), wherein direction X is in the direction towards the tape measure 102 and direction X' is in the direction away from the tape measure 102 (see FIG. 7).

As best shown in FIGS. 9B and 10, the section wall 1562 may further include a raised surface 1542a that generally outlines the shape of the J-shaped marking member movement direction aperture 1542 and may further include linear parallel tracks 1542b' and 1542b" that extend longitudinally in the direction of the length of the attachment assembly 120 shown by double arrow X-X'. At proximal end 150b, the section wall 1502 may also include a projecting stop member 1572. Although not shown, mirror-image structures may be included on opposite section wall 1561 of section 1501.

The marking fluid storage member support base 1508 is configured and disposed in the guide housing 150 so as to be parallel to the direction of the length of the attachment assembly 120 shown by the double arrow X-X'. Thereby, the marking fluid storage member 140, having a plate-like configuration, is supported by the marking fluid storage member support base 1508 also to be parallel to the direction of the length of the attachment assembly 120 shown by the double arrow X-X'.

The internal volume 124 of the compartment 122 of the attachment assembly 120 is sufficient to receive an energy storage member 182, shown by example as a coil spring, although a compressed gas or air piston and cylinder and the like may be employed. The guide housing 150 when received in the compartment 122 is constrained to move within the internal volume 124 of the compartment 122 in either direction along the length of the attachment assembly 120 shown by the double arrow X-X'. The energy storage member 182 is configured and disposed to be in operable communication with the guide housing 150 by being inserted between and contacting distal end wall 126 of the compartment 122 and a guide housing support plate 1510 configured and disposed at distal end 150b of the guide housing 150.

The attachment assembly 120 includes a panel member 190, shown for example in the shape of a rectangle, that defines a panel member marking member access aperture 192 therein. In the example of FIG. 9B, the aperture 192 is rectangularly shaped and defines a width W12 across the width of the panel member 190 and a length L12 along the length of the panel member 190 also in the direction X-X'.

The compartment 122 defines therein hinge receiving apertures 1301a and 1302a that are disposed proximally with respect to guide members 128a, 128b and 128c, 128d and hinge receiving apertures 1301b, 1302b that are disposed distally with respect to guide members 128a, 128b and 128c, 128d. The panel member 190 defines hinge members 1901a and 1902a that project orthogonally from inner surface of the panel member 190 and are disposed proximally with respect to aperture 192 and hinge members 1901b and 1902b that also project orthogonally from inner surface 190' and are disposed distally with respect to aperture 192. Thereby, to partially seal the internal volume 124 of the compartment 122, the panel member 190 engages with the attachment assembly 120 via the proximal hinge members 1901a and 1902a engaging the proximal hinge receiving apertures 1301a and 1302a, respectively, and distal hinge members 1901b and 1902b engaging the distal hinge receiving apertures 1301b and 1302b, respectively. When engaged with the attachment assembly 120, the panel member 190 and the attachment assembly 120 define a guide housing access aperture 124' at proximal end 120a of the attachment assembly 120 in communication with the internal volume 124 that is configured to receive the guide housing 150 and energy storage member 182.

As best shown in FIGS. 10 and 13A, and as described in more detail below, the energy storage member 182 is configured and disposed in the attachment assembly 120, with the panel member 190 attached, to allow movement of the guide housing 150 such that the marking member 170 is enabled to move from marking fluid storage member contacting position A, where the marking member 170 is in contact with the marking fluid storage member 140 that is oriented to be parallel to the direction of the length of the attachment assembly 120 shown by the double arrow X-X', including the intermediate positions such as I, to the marking position M enabling contact with an object to be marked. The raised surfaces 1542a, 1542b' and 1542b'', when provided, reduce the surface friction of the section wall 1562 (and similarly section wall 1561) as the guide housing 150 reversibly moves in the direction X-X'. Projecting stop member 1572 is configured and disposed to minimize the probability of the guide housing 150 inadvertently becoming separated from the attachment assembly 120. Additionally, the raised surfaces 1542a, 1542b' and 1542b'', when provided, provide space to accommodate guide members 128a, 128b and 128c, 128d.

In an initial unactuated condition, corresponding to marking fluid storage member contacting position A, the energy storage member 182 supports the guide housing 150 such that the proximal end 150a of the guide housing 150 projects a distance X1 proximally away from the guide housing access aperture 124' at proximal end 120a of the attachment assembly 120. In this position A, the guide housing marking member access aperture 153 is blocked by the panel member 190. The marking member 170 is in contact with the marking fluid storage member 140.

Referring now to FIGS. 13A and 13B, as a user applies pressure to proximal end 150a of guide housing 150 using his or her thumb T, the guide housing 150 moves proximally in the direction X by an amount $X_I$ that represents the X-direction distance of movement of the distal end 150b of the guide housing 150 within the internal volume 124 of the attachment assembly until the marking member 170 is forced to move in the direction d1 (and d2, the same as d1) by the resulting pressure applied to the arms of the T-shaped plate member 172 by the edges of the marking member movement direction apertures 1541 and 1542 while being guided by the movement of the guidance projection members 1721 and 1722 within the gaps g1 and g2 between the guide members 128a, 128b and 128c, 128d in the attachment assembly 120 until the marking member 170 has reached intermediate position I at the apexes of the J-shaped marking member movement direction apertures 1541 and 1542. In this position I, the stamping surface 176 that includes marking applicator 178 is now separated from, and not in contact with, the marking fluid storage member 140. The guide housing marking member access aperture 153 is still blocked by the panel member 190. The energy storage member 182 has been compressed in the X-direction also by amount $X_I$.

Proceeding now to FIGS. 11 and 13C, as a user continues to apply pressure to proximal end 150a of guide housing 150 using his or her thumb T, the guide housing 150 continues to move proximally in the direction X by an amount X1. The distance X1 represents the total X-direction distance of movement of the distal end 150b of the guide housing 150 within the internal volume 124 of the attachment assembly as the marking member 170 has been forced to move in the direction d1' (and d2', the same as d1'), opposite to the direction d1 (and d2), by the resulting pressure applied to the arms of the T-shaped plate member 172 by the edges of the marking member movement direction apertures 1541 and 1542. The T-shaped plate member 172 is guided by the movement of the guidance projection members 1721 and 1722 within the gaps g1 and g2 between the guide members 128a, 128b and 128c, 128d in the attachment assembly 120 until the marking member 170 has reached marking position M of the marking member movement direction apertures 1541 and 1542. In this position M, the stamping surface 176 that includes marking applicator 178 remains separated from, and not in contact with, the marking fluid storage member 140. The guide housing marking member access aperture 153 is now aligned with panel member marking member access aperture 192 to allow the stamping surface 176 and marking applicator 178 access through both the guide housing marking member access aperture 153 and the panel member marking member access aperture 192 to enable contact with an object to be marked (not shown). The energy storage member 182 has now been compressed in the X-direction also by amount X1.

In this position M, the user has now been enabled to mark a wall or floor or other surface or a material such as paper or cloth to record a particular desired location or distance from another previously marked location.

Turning now to FIGS. 10 and 13D, when the user releases his or her thumb from the proximal end 150a of the guide housing 150, the energy storage member 182 is now free to return to its original non-compressed condition by forcing the guide housing 150 to follow a reverse path in the direction X1' from marking position M to return to marking fluid storage member contacting position A by passing through intermediate positions such as at the apexes of the J-shaped marking member movement direction apertures 1541 and 1542.

Figure 14C:
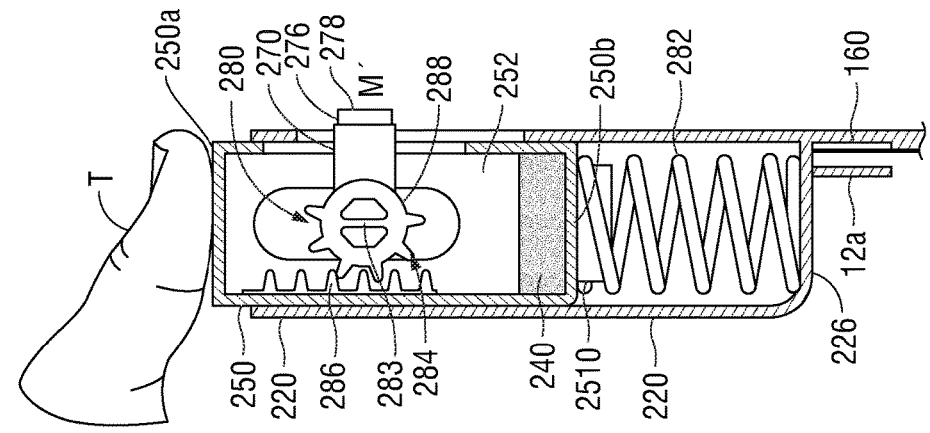
FIG. 14C is a cross-sectional, side view of the marking device of FIGS. 14A-14B in a depressed position, with the marking member in the marking position enabling contact with an object to be marked.
Figure 14B:
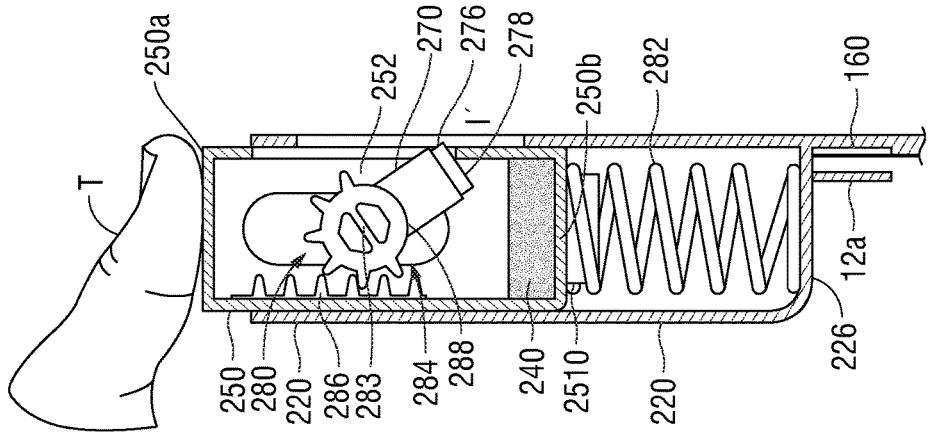
FIG. 14B is a cross-sectional, side view of the marking device of FIG. 14B in a depressed position, with the marking member in an intermediate position between the marking fluid storage member contacting position and the marking position enabling contact with an object to be marked.
Figure 14A:
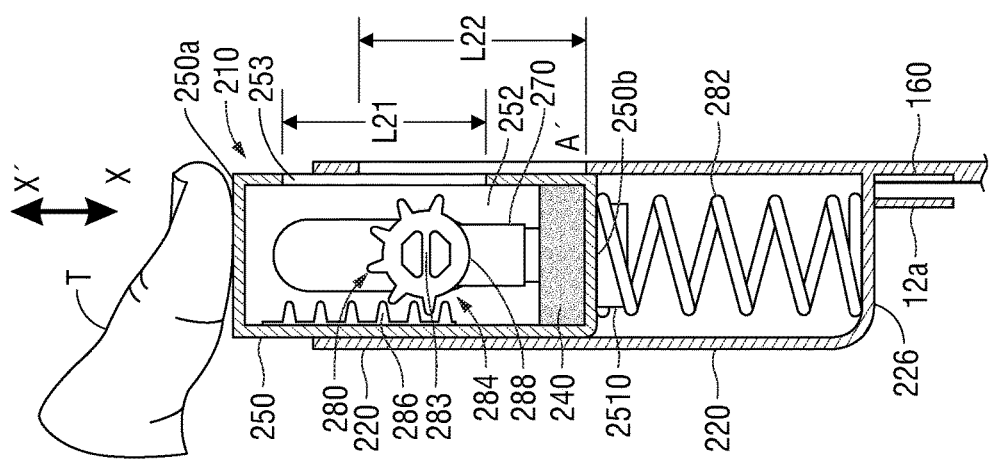
FIG. 14A is a cross-sectional, side view of an alternate embodiment of the marking device of FIGS. 7-13D in the resting position, with the marking member in the marking fluid storage member contacting position.

FIGS. 14A-14C illustrate an alternate example embodiment of marking device 110 that is configured to attach to measuring tape 102 of tape measure 100. More particularly, marking device 210 is identical to marking device 110 except for differences described herein.

Marking device 210 now includes a guide housing 250 wherein marking fluid storage member 240 is configured and disposed in proximity to distal end 250b of guide housing 250 within a marking member actuation cavity 252 such that the marking fluid storage member 240 is perpendicular to the direction of the length of attachment assembly 220 as shown again by the double arrow X-X', as opposed to being parallel to the length of the attachment assembly 120 as applicable to marking fluid storage member 140 in FIGS. 12 and 13A-13D.

Additionally, guide housing 250 includes guide structure 280 that is also configured to direct movement of a marking member 270 within marking member actuation cavity 252 from a first position enabling contact with the marking fluid storage member 240, e.g., marking fluid storage member contacting position A', to apply marking fluid to stamping surface 276 that includes a marking applicator 278 (see FIG. 14A) to a second position, e.g., marking position M' (see FIG. 13C), that enables contact by the marking applicator 278 with an object to be marked (not shown). The guide structure 280 also enables movement of the marking member 270 to intermediate positions such as position I' as shown in FIG. 14B wherein in position I', the stamping surface 276 that includes marking applicator 278 again is now separated from, and not in contact with, the marking fluid storage member 240.

The guide structure 280 differs from guide structure 180 of marking member 110 in that, instead of the marking member movement direction apertures 1541 and 1542 that form a part of the guide structure 180, guide structure 280 of guide housing 250 now includes a gear mechanism 284 that is configured and disposed to effect movement of the marking member 270 from the first position A' to the second position M'.

The guide housing 250 defines a guide housing marking member access aperture 253 having a width across the width of the guide housing 250 (not shown) and a length L21 along the length of the guide housing 250 in the direction of double arrows X-X'.

The gear mechanism 284 is rotatably supported on an axle 283 wherein movement of the guide housing 250 by a user of the marking device, e.g., via pressing his or her thumb T at proximal end 250a of the guide housing 250, enables movement of the marking member 270 therein by the gear mechanism 284 from the first position A' and intermediate positions such as I' through the guide housing marking member access aperture 253 to the second position M'. (See FIGS. 14A-14C).

In the example embodiment shown in FIGS. 14A-14C, the gear mechanism 284 is configured as a rack 286 and pinion 288 and that is disposed to effect movement of the marking member 270 from the first position A' and intermediate positions such as I' through the guide housing marking member access aperture 253 to the second or marking position M'.

Since the marking member 270 immediately moves towards the marking position M', as opposed to marking member 170 which via the J-shaped apertures 1541 and 1542 moves initially away from the object to be marked, the length L21 of guide housing marking member access aperture 253 is greater than the length L11 of guide housing marking member access aperture 153 of guide housing 150 (see FIG. 9B).

In a similar manner as for marking device 110, marking device 210 also includes an attachment assembly 220 that includes a panel member 290 that defines a panel member marking member access aperture 292 that at least partially aligns with the guide housing marking member access aperture 192 to allow the stamping surface 276 and marking applicator 278 access through both the guide housing marking member access aperture 253 and the panel member marking member access aperture 292 during at least intermediate positions I' to the marking position M' to enable contact with an object to be marked (not shown).

For the same reason as with respect to guide housing marking member access aperture 253, length L22 of panel member marking member access aperture 292 is greater than length L12 of panel member marking member access aperture 192 of attachment assembly 120.

In a similar manner as with respect to marking device 110, marking device 210 also includes an energy storage member 282 that is configured and disposed to be in operable communication with the guide housing 280 by being inserted between and contacting distal wall 226 of the compartment 222 and a guide housing support plate 2510 configured and disposed at distal end 250b of the guide housing 250.

Those skilled in the art will recognize and understand that the operation of marking device 210 is otherwise similar to the operation of marking device 110 as described above and that marking device 210 is also configured with the tape measure supporting plate 160, projecting members 12a and 12b and projecting member support member 162 and otherwise operates in the same manner as marking device 110.

Figure 15:
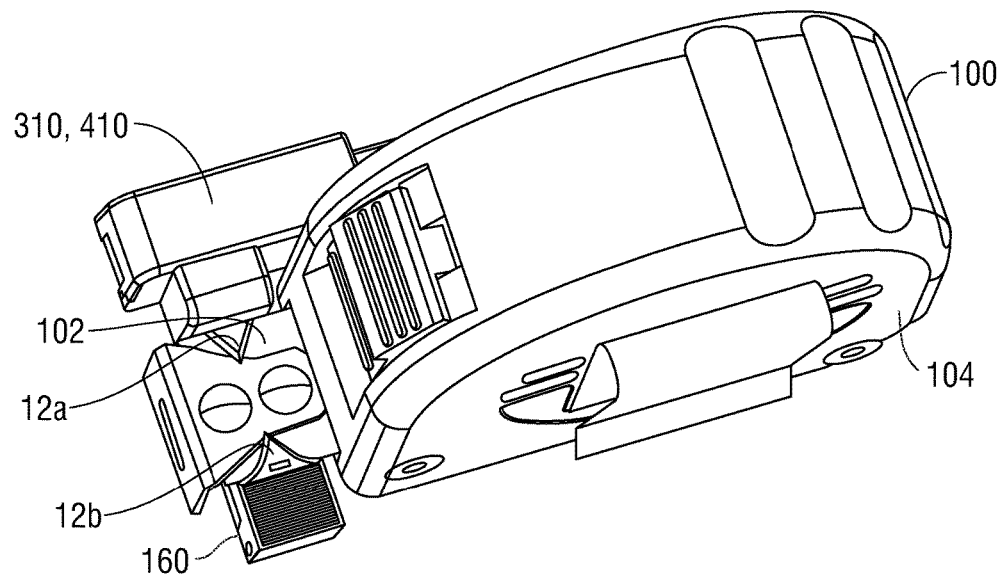
FIG. 15 illustrates one or more alternate embodiments of the marking devices of FIGS. 7-14C wherein the attachment assemblies and guide housings are oriented at right angles to the tape measure supporting plate.
Figure 16:
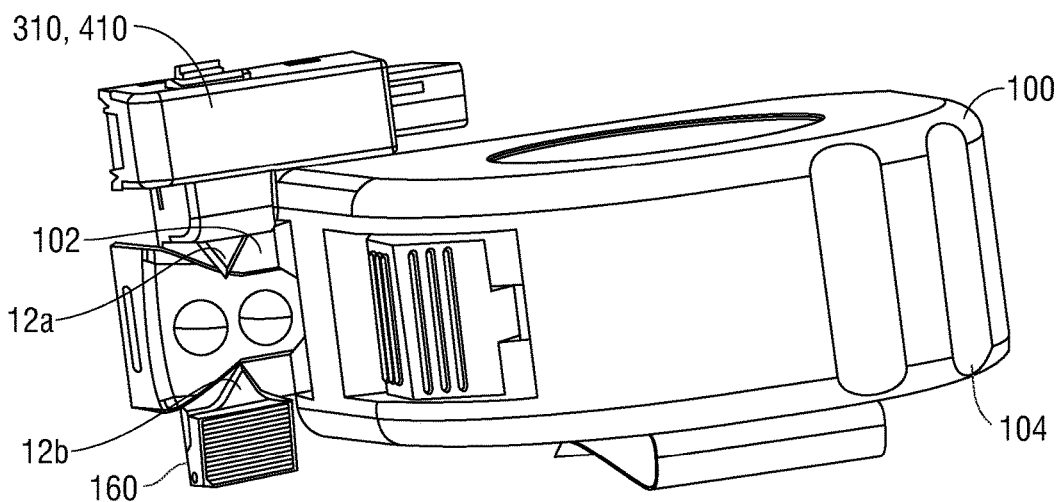
FIG. 16 is another top perspective view of the one or more alternate tape measure and marking devices of FIG. 15 and wherein the tape measure is in a retracted position.
Figure 17:
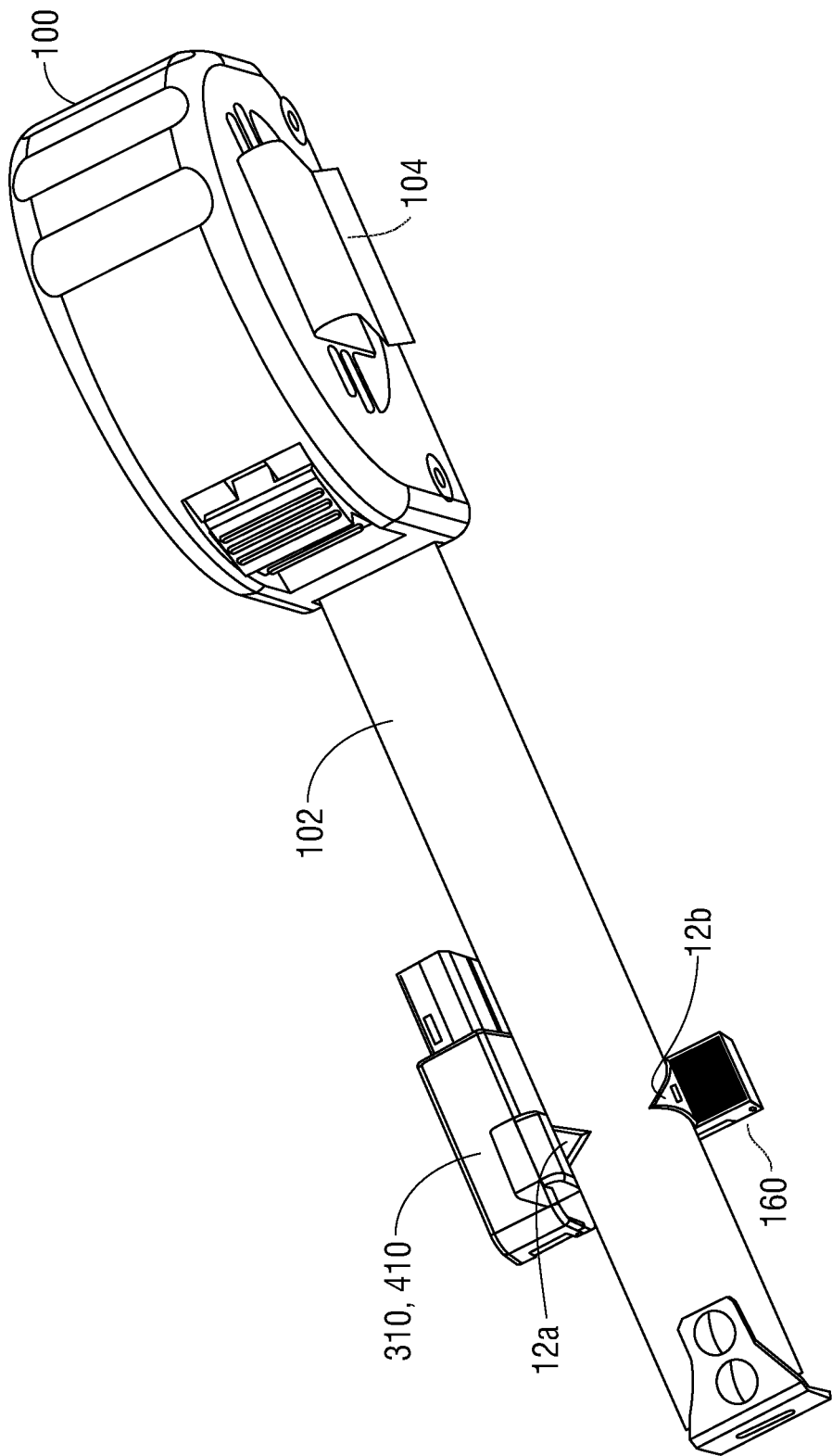
FIG. 17 is yet another top perspective view of the alternate embodiments of the tape measure and marking devices of FIGS. 15 and 16 wherein the tape measure is extended from its housing and the marking device is located at a position on the extended tape measure.

FIGS. 15-17 illustrate an alternate embodiment of the marking devices 110 and 210 of FIGS. 7-14C.

More particularly, marking device 310 is analogous to marking device 110 and marking device 410 is analogous to marking device 210 wherein the attachment assemblies 120 and 220 and guide housings 150 and 250, respectively, are oriented at right angles (90°) to the tape measure supporting plate 160. The tape measure supporting plate 160 attaches to the measuring tape 102 of tape measure 100 in the same manner as described previously. In FIGS. 15 and 16, the measuring tape 102 is in a retracted position within the tape measure housing 104. In FIG. 17, the measuring tape 102 and the marking device 310 or measuring tape 102 and marking device 410 are in an extended position with respect to the housing 104. Again, marking applicator 178 is oriented in a direction to align with a straight line formed between projecting members 12a and 12b so that the mark provided by marking applicator 178 coincides with the tape measure measurement desired by a user (see FIG. 7).

Figure 18:
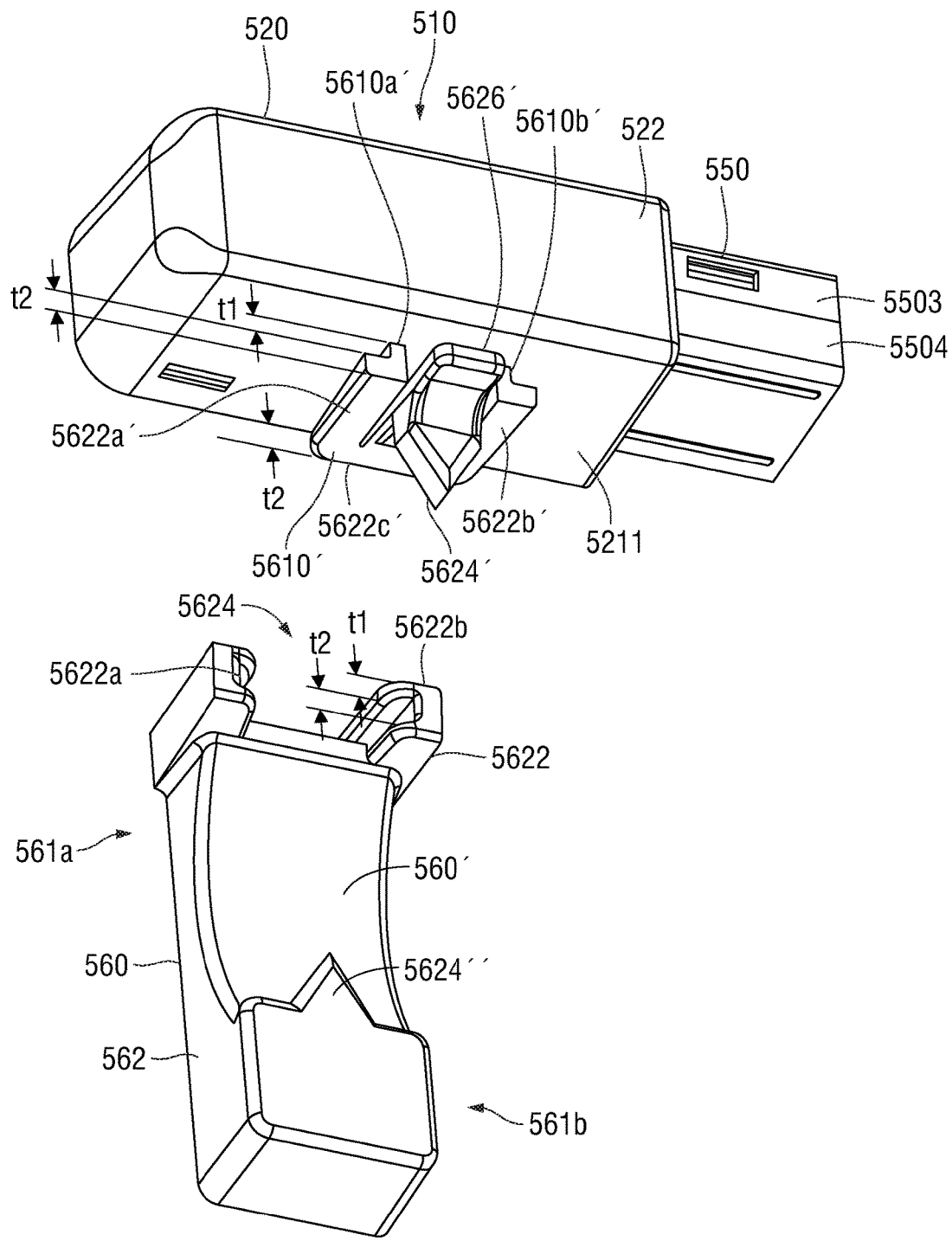
FIG. 18 is a top perspective view of another alternate embodiment of the marking devices of FIGS. 15-17 without the tape measure and illustrating a removable tape measure supporting plate disengaged from the attachment assembly of the marking device.

FIG. 18 is a top perspective view of an alternate embodiment of the marking devices 310, 410 of FIGS. 15-17 but without the measuring tape 102. Marking device 510 illustrated in FIG. 18 differs from marking devices 310 and 410 via a detachable tape measure supporting plate 560 that is disengaged from attachment assembly 520 of the marking device 510. Due to the similarities with marking devices 110 and 210, like components will be designated correspondingly in the 500 series. Additionally, due to the similarities in operation and design of marking device 510 with the marking devices 110 and 210 as well as with marking devices 310 and 410, generally only those features of marking device 510 that differ from marking devices 110 and 210 and also marking devices 310 and 410 will be described herein.

More particularly, marking device 510 includes attachment assembly 520 for movably attaching the marking device 510 to measuring tape 102 of tape measure 100. The marking device 510 also includes guide housing 550 that is movably engageable with the attachment assembly 520. Upper walls 5503 and 5504 of the guide housing 550, which are analogous to upper walls 1503 and 1502 on first sections 1501 and 1502 of marking device 110 in FIGS. 9A and 9B are exposed and extending from compartment 522 when the marking device 510 is in the resting position as shown in FIG. 18. The attachment assembly 520 and the guide housing 550 are operable in the same manner as described above with respect marking device 110 and as shown in FIGS. 7-13D or as with respect to marking device 210 in FIGS. 14A-14C.

The attachment assembly 520 includes a sidewall 5211 that forms a boundary for compartment 522 that receives the guide housing 550. Sidewall 5211 is positioned immediately adjacent to the measuring tape 102 (not shown in FIG. 18—refer to FIGS. 15-17) and includes a U-shaped support bracket 5610' mounted thereon via projections 5610a' and 5610b' that extend along the inner side edges of arms 5622a' and 5622b' of the U-shaped support bracket 5610'. The projections 5610a' and 5610b' are directly adhered to the sidewall 5211 and thus cause the arms 5622a' and 5622b' and base 5622c' of the U-shaped support bracket 5610' to extend a distance t1 away from the sidewall 5211. The arms 5622a' and 5622b' and the base 5622c' define a thickness t2.

A triangular prong-shaped projecting member 5624' is mounted on a base 5626' that faces the sidewall 5211 such that the triangular prong-shaped projecting member 5624' and the base 5626' occupy the space formed by the arms 5622a' and 5622b' and the base 5622c' of the U-shaped support bracket 5610' thus enabling the triangular prong-shaped projecting member 5624' to project generally orthogonally away from the sidewall 5211.

The detachable or removable tape measure supporting plate 560 is configured to be oriented orthogonally to sidewall 5211 thereby defining a wall end 561a that is positioned adjacent to the sidewall 5211 and a free end 561b that is configured to extend orthogonally away from sidewall 5211 when the removable tape measure supporting plant 560 is engaged with the U-shaped support bracket 5610'. The removable tape measure supporting plate 560 defines a curved surface 560' cross-section (as best shown in FIG. 25 below) that spans between a support bracket reception member 5622 at wall end 561a and a projecting member support member 562 at free end 561b.

Figure 19:
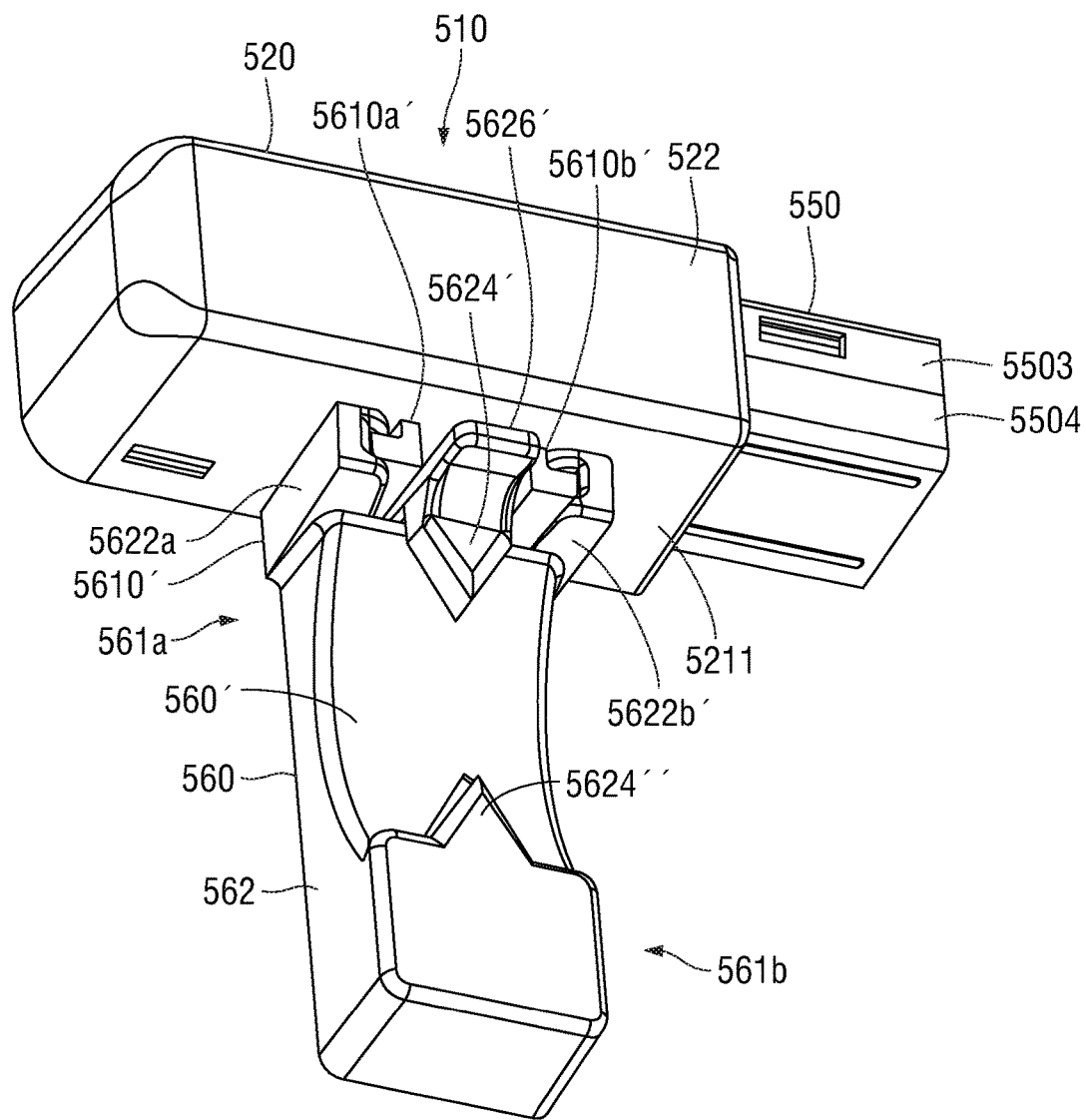
FIG. 19 is another top perspective view of the marking device of FIG. 18 without the tape measure and the tape measure supporting plate engaged with the attachment assembly of the marking device but wherein the tape measure supporting plate is removable from the attachment assembly.
Figure 20:
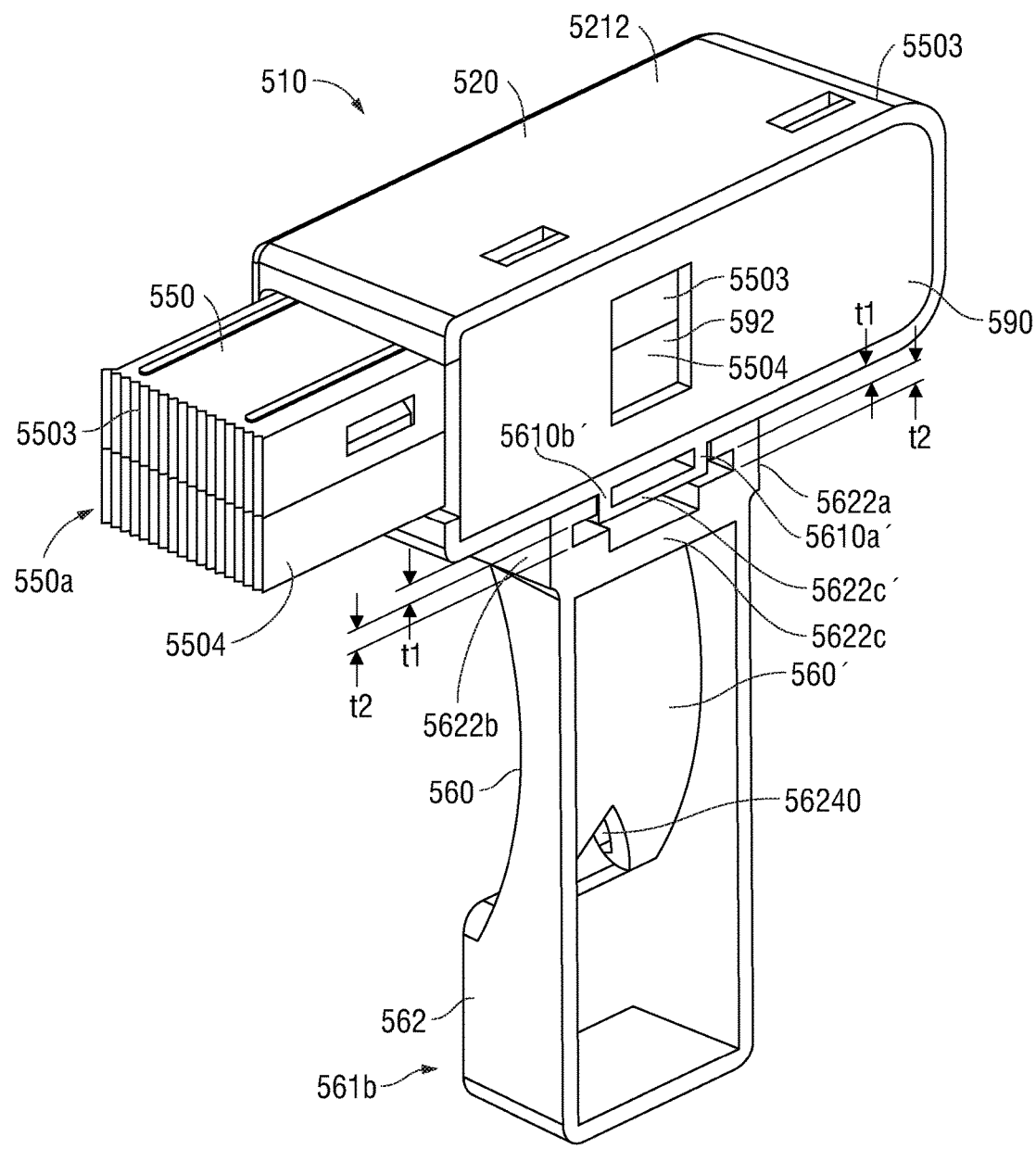
FIG. 20 is a perspective view of the bottom of the marking device of FIGS. 18 and 19 without the tape measure and now illustrating a panel member marking member access aperture on the attachment assembly of the marking device and illustrating a bottom view of the tape measure supporting plate wherein the tape measure supporting plate is engaged with the attachment assembly and wherein the guide housing is in a resting position.
Figure 21:
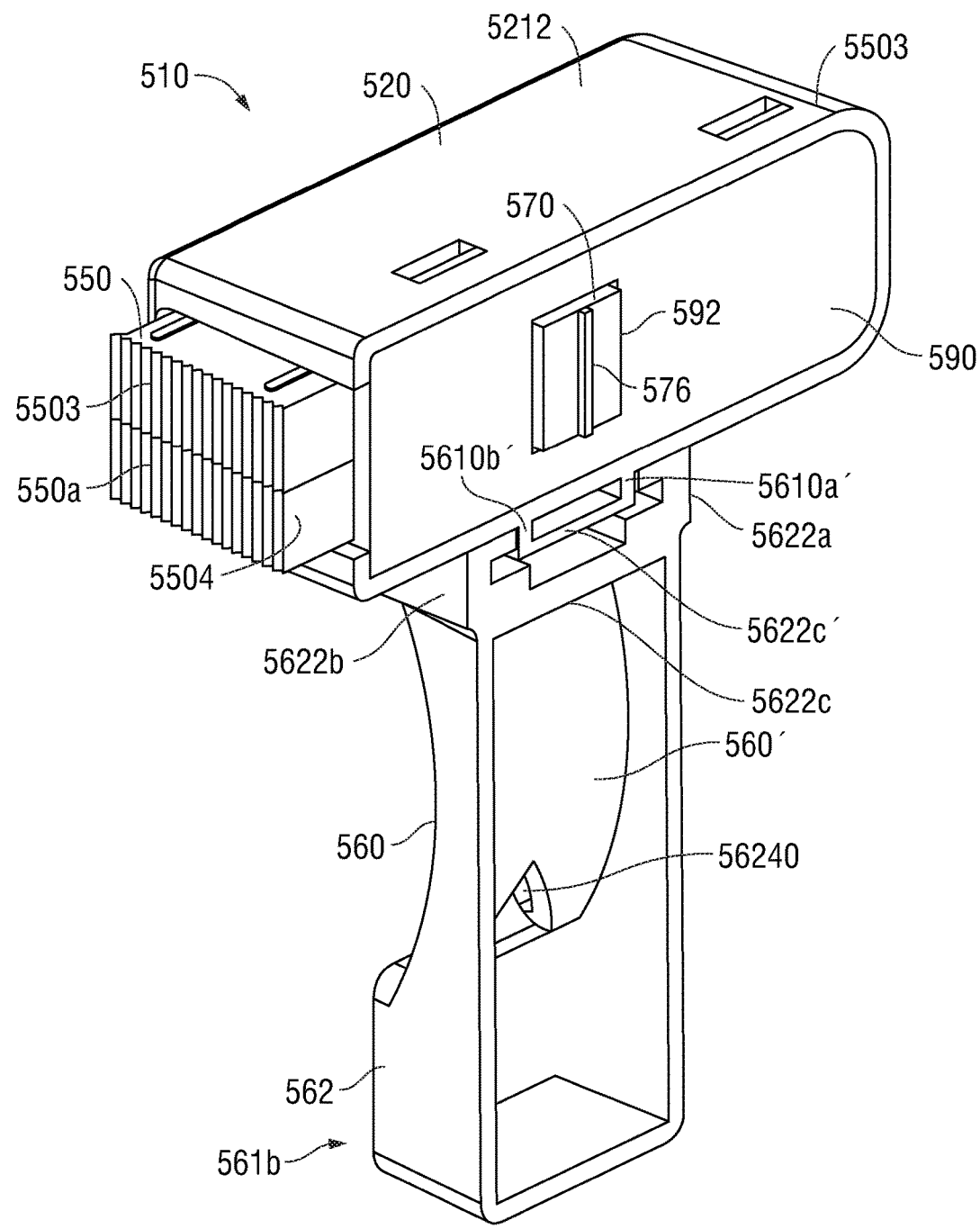
FIG. 21 is a perspective view of the bottom of the marking device of FIG. 20 wherein guide housing is in a depressed position such that the marking applicator is oriented in a direction to align with a mark on the tape measure.

The support bracket reception member 5622 is also generally U-shaped having an open end 5624 that defines a U-shaped internal volume within the U-shaped support bracket reception member 5622 that is configured and disposed to receive the U-shaped support bracket 5610' while, as best shown in FIGS. 19-21, enabling rear surfaces and side arms 5622a and 5622b and a base 5622c of the U-shaped support bracket reception member 5622 to slide across the sidewall 5211 and be received within the volumes of space defined by the distance t1 that the arms 5622a' and 5622b' and base 5622c' of the U-shaped support bracket 5610' extend away from the sidewall 5211, Thus, as best shown in FIGS. 20 and 21, the rear surfaces and side arms 5622a and 5622b also generally define thickness t1 that is generally equal to the distance t1 that the arms 5622a' and 5622b' and base 5622c' of the U-shaped support bracket 5610' extend away from the sidewall 5211 while the arms 5622a' and 5622b' and base 5622c' of the U-shaped support bracket 5610' define thickness t2 that is generally equal to the major dimension characterizing the U-shaped internal volume within the U-shaped support bracket reception member 5622.

Figure 25:
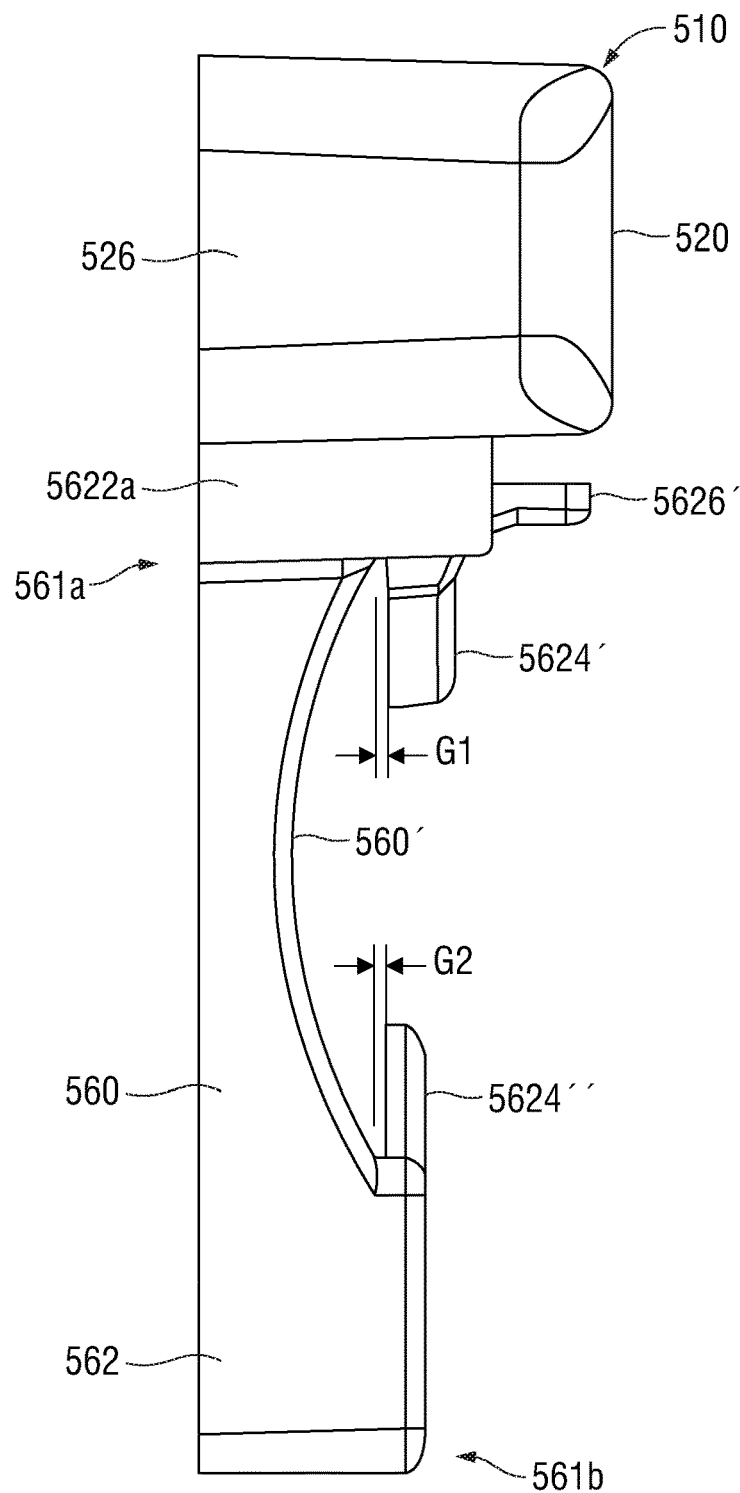
FIG. 25 is a side elevation view of the attachment assembly and the tape measure supporting plate of the marking device of FIGS. 18-24.
Figure 26:
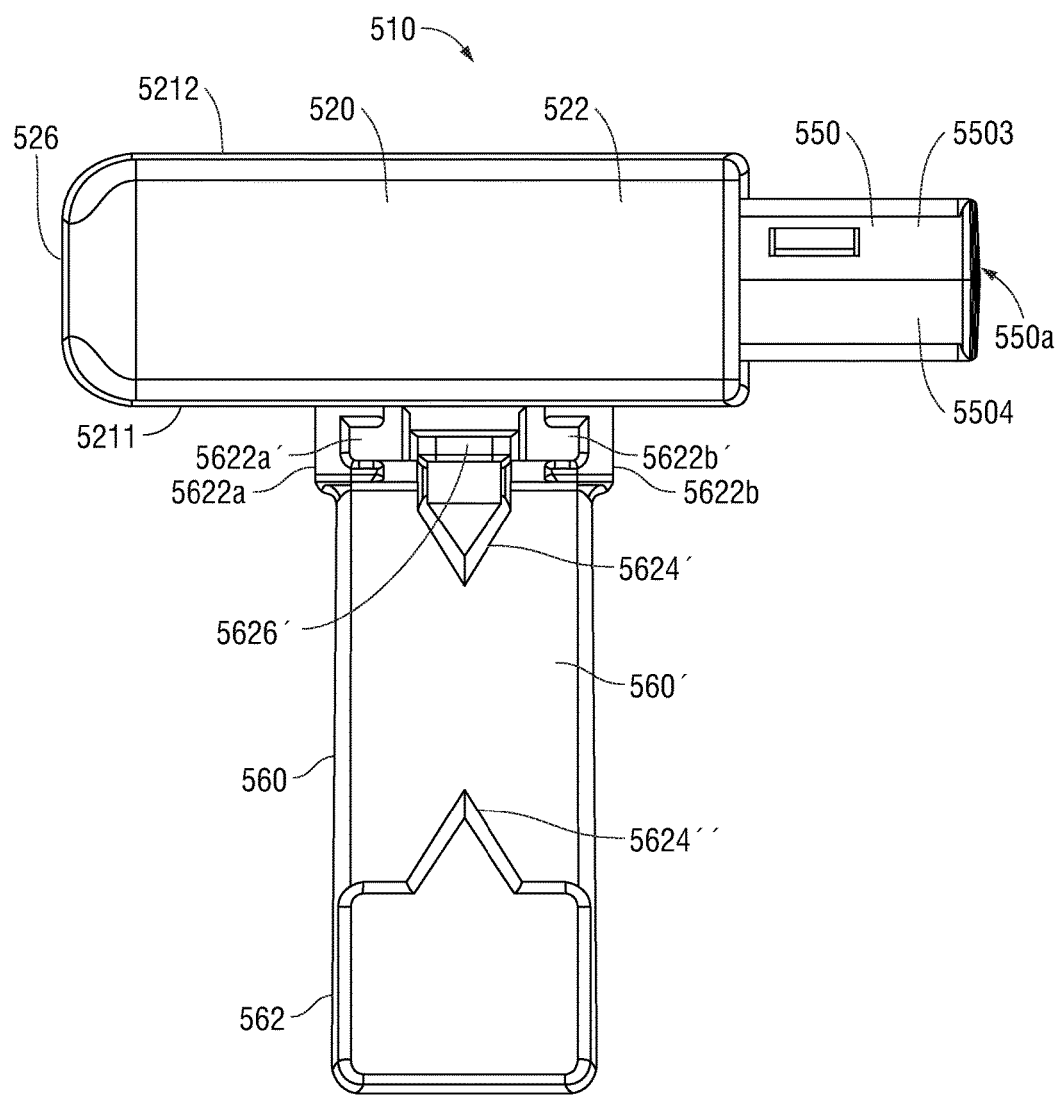
FIG. 26 is a direct plan view of the top of the attachment assembly and the tape measure supporting plate of the marking device of FIGS. 18-25.

Referring to FIGS. 19, 25 and 26, wherein the removable tape measure supporting plate 560 is engaged with the U-shaped support bracket 5610', in a similar manner as with respect to marking device 110 as described above with respect to the projecting members 12a and 12b and projecting member support member 162 as shown in FIGS. 8A-8B, a projecting member support member 562 is configured and disposed at free end 561b of the a curved surface 560' and includes a triangular prong-shaped projecting member 5624" that extends over the curved surface 560' in the direction of wall end 561a and projects from the projecting member support member 562 such that when the removable tape measure supporting plate 560 is engaged with the U-shaped support bracket 5610', the triangular prong-shaped projecting member 5624' mounted on base 5626' that faces sidewall 5211 and the triangular prong-shaped projecting member 5624" each define gaps G1 and G2, respectively, in a manner analogous to the marking device 110 as illustrated in FIGS. 8A-8B, to enable measuring tape 102 to be inserted therethrough over the curved surface 560'.

FIG. 20 illustrates is a perspective view of the bottom of the marking device 510 of FIGS. 18 and 19 without the measuring tape 102. More particularly, the attachment assembly 520 of the marking device 510 includes a sidewall 5212 that is on an opposing side of the sidewall 5211 in FIGS. 18 and 19. The attachment assembly 520 includes a panel member 590 and a panel member marking member access aperture 592 that are generally similar to panel member 190, shown for example in the shape of a rectangle, that defines panel member marking member access aperture 192 therein, as described above with respect to marking device 110 in FIG. 9B.

As in FIG. 19, the tape measure supporting plate 560 is engaged with the attachment assembly 520 and the guide housing 550 is in a resting position. As can be seen, in the embodiment of the marking device 510 illustrated, the bottom side of the removable tape measure supporting plant 560 does not include an enclosure plate so that the bottom side of curved surface 560' is directly visible. To facilitate manufacturing, a triangular prong-shaped aperture 56240 is defined in the curved surface 560' beneath and aligning with the triangular prong-shaped projecting member 5624' in proximity to the free end 561b of the removable tape measure supporting plate 560 beneath the triangular prong-shaped projecting member 5624".

Since the guide housing 550 is in the resting position in FIGS. 18, 19 and 20, in FIG. 20, only portions of the upper walls 5503 and 5504 are visible through the panel member marking member access aperture 592.

FIG. 20 also provides a bottom view of the projections 5610a' and 5610b' that are directly adhered to the sidewall 5211 (see FIGS. 18 and 19) and thus cause the arms 5622a' and 5622b' and base 5622c' of the U-shaped support bracket 5610' to extend distance t1 away from the sidewall 5211. As described above, the arms 5622a' and 5622b' and the base 5622c' define thickness t2.

FIG. 21 is another bottom perspective view of the marking device 510 as illustrated and described above with respect to FIG. 20. However, guide housing 550 is in a depressed position extending into the compartment 522 such that stamping surface 576 and marking applicator 578 of marking member 570 now penetrate through panel member marking member access aperture 592 in a manner analogous to marking surface 176 and marking applicator 178 of marking member 170 and panel member marking member access aperture 192 in a manner analogous to as described above with respect to marking device 110 in FIGS. 9A, 11 and 12. However, since the detachable or removable tape measure supporting plate 560 is configured to be oriented orthogonally to sidewall 5211 of the attachment assembly 520, stamping surface 576 and marking applicator 578 are now rotated 90° to be oriented in a direction to align with a mark on the tape measure 102 as compared to the orientation of marking applicator 178 on stamping surface 176 in FIGS. 9A, 11 and 12 with respect to marking device 110.

Figure 22:
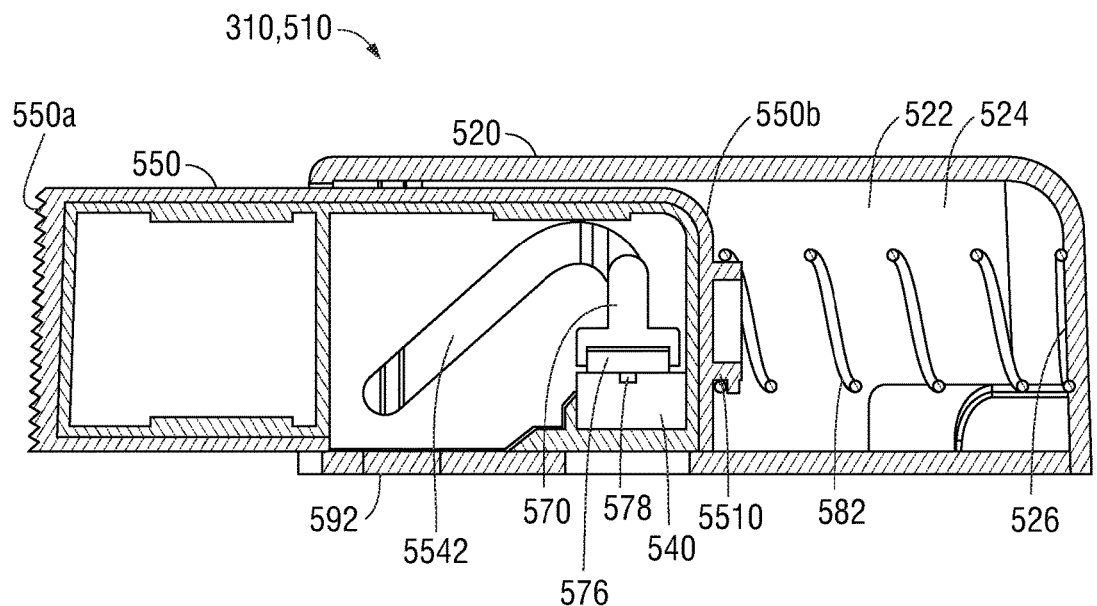
FIG. 22 is a cross-sectional, side view of the marking device of FIGS. 15-16 and 18-21 in the resting position, with the marking member in the marking fluid storage member contacting position.

FIG. 22 is a cross-sectional, side view of the marking devices 310 and 510 of FIGS. 15-21 in the resting position, with the marking member 570 in a contact position with marking fluid storage member 540 in a manner analogous to marking device 110 as described above with respect to FIGS. 11 and 13A and will not be discussed further. Analogous to marking device 110, the guide housing 550 of marking devices 310 and 510 defines a proximal end 550a (see FIG. 20) that is depressed by contact from a user and a distal end 550b. The guide housing also defines a J-shaped marking member movement direction aperture 5542 that is analogous to marking member movement direction aperture 1542.

Again in an analogous manner, internal volume 524 of compartment 522 of the attachment assembly 520 is sufficient to receive an energy storage member 582, shown by example as a coil spring, although a compressed gas or air piston and cylinder and the like may be employed. The guide housing 550 when received in the compartment 522 is constrained to move within the internal volume 524 of the compartment 522 in either direction along the length of the attachment assembly 520, as shown analogously in FIG. 10 by the double arrow X-X'. The energy storage member 582 is configured and disposed to be in operable communication with the guide housing 550 by being inserted between and contacting distal wall 526 of the compartment 522 and a guide housing support plate 5510 configured and disposed at distal end 550b of the guide housing 550.

Figure 23:
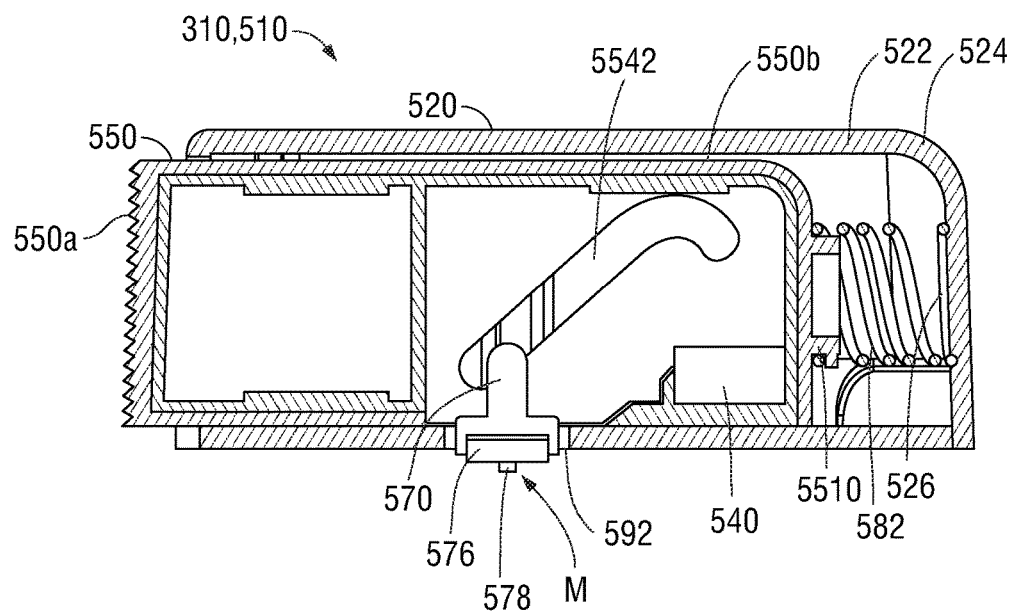
FIG. 23 is a cross-sectional, side view of the marking devices of FIGS. 15-16 and 18-22 in a depressed position, with the marking member in the marking position enabling contact with an object to be marked.

FIG. 23 is a cross-sectional, side view of the marking devices 310 and 510 of FIGS. 15-22 in a depressed position analogous to marking device 110 as illustrated and described with respect to FIG. 13C, wherein the energy storage member 582 is in a compressed condition and with the marking member 570 in marking position M enabling contact with an object to be marked. In the marking position M, as in FIG. 21, the stamping surface 576 and marking applicator 578 of marking member 570 now penetrate through panel member marking member access aperture 592 such that stamping surface 576 and marking applicator 578 are now rotated 90° to be oriented in a direction to align with a mark on the tape measure 102 as compared to the orientation of marking applicator 178 on stamping surface 176 in FIGS. 9A, 11 and 12 with respect to marking device 110, as described above.

Figure 24:
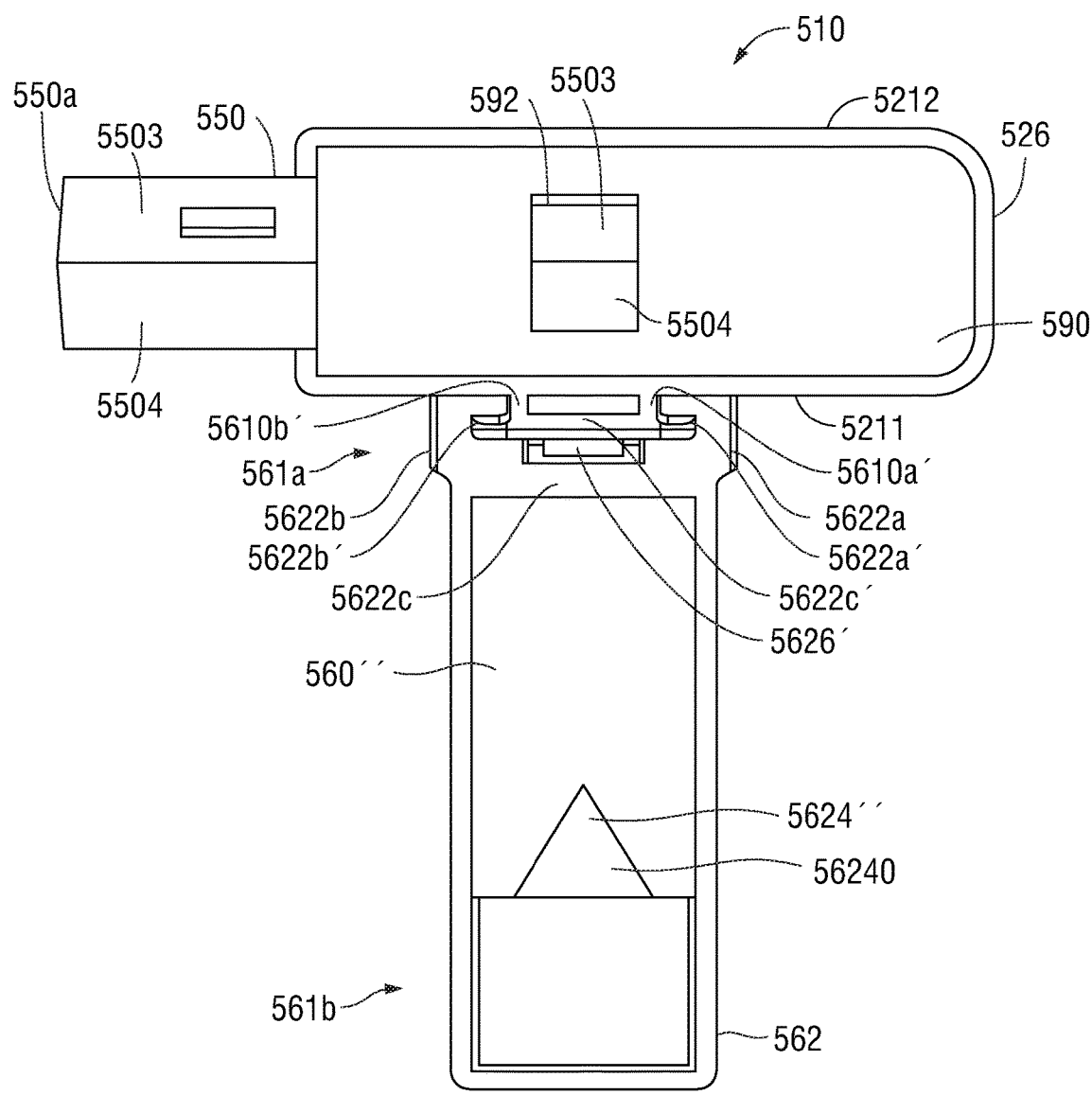
FIG. 24 is a direct plan view of the bottom of the attachment assembly and the tape measure supporting plate of the marking device of FIGS. 18-23.

FIG. 24 is a direct plan view of the bottom of the attachment assembly 520 and the tape measure supporting plate 560 of the marking device 510 of FIGS. 18-23 and most particularly is a direct plan view of the marking device 510 in the perspective view illustrated in FIG. 21. Accordingly, those skilled in the art will recognize that the description and operation of the marking device 510 in FIG. 24 are generally identical to the description and operation of marking device 510 as described above with respect to FIG. 21.

FIG. 25 is a side elevation view of the attachment assembly 520 and the tape measure supporting plate 560 of the marking device 510 of FIGS. 18-24 and showing the gap G1 between the tape measure supporting plate surface 560' and the projecting member 5624' and gap G2 between the tape measure supporting plate surface 560' and the projecting member 5624" as described above with respect to FIG. 19.

FIG. 26 is a direct plan view of the top of the attachment assembly 520 and the tape measure supporting plate 560 of the marking device of FIGS. 18-25 and most particularly is a direct plan view of the marking device 510 in the perspective views of FIGS. 18 and 19 as described above.

Those skilled in the art will recognize that marking device 510 may also be configured in a similar manner as marking devices 210 and 410 by including the features of FIGS. 14A-14C in place of FIGS. 13A-13D.

Those skilled in the art will recognize that tape measure supporting plate 160 of marking device 110, as illustrated most particularly in FIGS. 8A-8B, may be configured and disposed as removable from and attachable to distal end wall 126 of the compartment 122 in a similar manner as described above with respect to tape measure supporting plate 560 and sidewall 5211.

Additionally, those skilled in the art will recognize that while the marking devices 110-510 and their alternate embodiments have been illustrated by example to be configured and/or positioned adjacent to a right side of measuring tape 102 in FIGS. 7 and 15-17, which may facilitate usage by a right-handed user or to suit conditions and location of the object to be measured, to facilitate usage by a left-handed user or to suit conditions and location of the object to be measured, the marking devices 110-510 and their alternate embodiments may be configured and/or positioned adjacent to a left side of measuring tape 102 in FIGS. 7 and 15-17.

Although the present disclosure has been described in considerable detail with reference to certain embodiments, other embodiments and versions are possible and contemplated. Therefore, the spirit and scope of the appended claims should not be limited to the description of the embodiments contained herein.

What is claimed is:

1. A marking device configured to attach to a tape measure, the marking device comprising:
   an attachment assembly for movably attaching the marking device to a tape measure; and
   a guide housing movably engageable with the attachment assembly,
   the guide housing configured and disposed to receive a marking member and a marking fluid storage member,
   the guide housing configured to direct movement of the marking member from a first position enabling contact with the marking fluid storage member to a second position that enables contact with an object to be marked.

2. The marking device according to claim 1, wherein the attachment assembly includes a compartment that defines an internal volume that is configured and disposed to receive the guide housing.

3. The marking device according to claim 1, wherein the guide housing is configured to direct movement of the marking member from the second position to the first position.

4. The marking device according to claim 1, wherein the guide housing includes at least one aperture defined therein to direct movement of the marking member from the first position to the second position.

5. The marking device according to claim 4, wherein the at least one aperture defined in the guide housing is configured and disposed to enable engagement with the marking member and movement of the marking member therein from the first position to the second position.

6. The marking device according to claim 1, wherein the guide housing defines at least one aperture therein that is configured and disposed to enable contact of the marking member with an object to be marked.

7. The marking device according to claim 1, wherein an energy storage member is configured and disposed in the attachment assembly to allow movement of the guide housing such that the marking member is enabled to move from the first position to the second position.

8. The marking device according to claim 7, wherein the energy storage member includes a spring disposed in the attachment member and in operable communication with the guide housing.

9. The marking device according to claim 4, wherein the guide housing includes a gear mechanism configured and disposed to effect movement of the marking member from the first position to the second position.

10. The marking device according to claim 9, wherein the guide housing defines an aperture configured and disposed to interface with the gear mechanism such that movement of the guide housing by a user of the marking device enables movement of the marking member from the first position and through the aperture to the second position.

11. The marking device according to claim 9, wherein the gear mechanism comprises a rack and pinion configured and disposed to effect movement of the marking member from the first position to the second position.

12. The marking device according to claim 1, wherein the guide housing is configured in a separable two section configuration wherein one section defines an aperture or both sections define an aperture configured to receive the marking member to direct movement of the marking member from the first position to the second position.

13. The marking device according to claim 12, wherein each section is configured to receive therein the marking fluid storage member.

14. The marking device according to claim 13, wherein the apertures defined in each section are configured to receive the marking member to direct in tandem movement of the marking member from the first position to the second position.

15. The marking device according to claim 11, wherein the attachment assembly includes a panel member that defines an aperture configured and disposed to enable the marking member to contact an object to be marked when the marking member is in the second position that enables contact with an object to be marked.

16. The marking device according to claim 1, wherein the attachment assembly defines an internal volume configured to receive the guide housing therein.

17. The marking device according to claim 16, wherein the attachment assembly includes at least one guide member configured and disposed within the internal volume to engage with the marking member to maintain orientation of the marking member as the marking member travels from the first position enabling contact with the marking fluid storage member to the second position that enables contact with an object to be marked.

18. The marking device according to claim 15, wherein the attachment assembly defines an internal volume configured to receive the guide housing therein and wherein the panel member engages with the attachment assembly to at least partially seal the internal volume.

19. The marking device according to claim 16,
wherein the guide housing is actuated via an energy storage member configured and disposed to effect movement of the marking member from the second position to the first position and
wherein upon a user depressing the guide housing into the internal volume, the energy storage member reverses movement of the guide housing out of the internal volume when the user releases the guide housing.

20. The marking device according to claim 1, wherein the attachment assembly comprises:
a tape measure supporting plate projecting from the attachment assembly; and
at least one projecting member extending from the attachment assembly and positioned with respect to the tape measure supporting plate to define a gap between the tape measure supporting plate and the at least one projecting member; and
a projecting member support member including at least one projecting member extending from the projecting member support member towards the attachment assembly and positioned with respect to the tape measure supporting plate to define a gap between the tape measure supporting plate and the at least one projecting member,
the tape measure supporting plate projecting from the attachment assembly to define a distance between the attachment assembly and the projecting member support member that enables insertion of a tape measure therebetween.

21. The marking device according to claim 1, wherein the attachment assembly defines an end wall and at least one sidewall, the attachment assembly comprising:
a tape measure supporting plate projecting from one of the end wall or from one of the at least one sidewalls of the attachment assembly.

22. The marking device according to claim 21, wherein the tape measure supporting plate projects from the end wall and the tape measure supporting plate is removable from the end wall.

23. The marking device according to claim 21, wherein the tape measure supporting plate projects from one of the at least one sidewalls and the tape measure supporting plate is removable from the one of the at least one sidewalls.

24. The marking device according to claim 20, wherein the projecting member support member is pivotally joined to the tape measure supporting plate.

25. The marking device according to claim 24, wherein the projecting member support member is configured and disposed to pivot from a first position that enables insertion of the tape measure on the tape measure supporting plate to a second position that defines the gap between the tape measure supporting plate and the at least one projecting member.

26. A marking device configured to attach to a tape measure, the marking device comprising:
an attachment assembly for movably attaching the marking device to a tape measure;
a guide housing movably engageable with the attachment assembly,
the guide housing configured to receive a marking member and a marking fluid storage member,
the guide housing configured and disposed to direct movement of the marking member from a first position enabling contact with the marking fluid storage member to a second position that enables contact with an object to be marked; and a tape measure supporting plate projecting from the attachment assembly;

wherein the tape measure supporting plate is removable from the attachment assembly.

27. The marking device according to claim 26, wherein the guide housing is actuated via an energy storage member configured and disposed to effect movement of the marking member from the second position to the first position.

28. A marking device configured to attach to a tape measure, the marking device comprising:

an attachment assembly for movably attaching the marking device to a tape measure; and a guide housing movably engageable with the attachment assembly, the guide housing configured to receive a marking member and a marking fluid storage member, the guide housing configured and disposed to direct movement of the marking member from a first position enabling contact with the marking fluid storage member to a second position that enables contact with an object to be marked, wherein the attachment assembly defines an end wall and at least one sidewall, the attachment assembly including a tape measure supporting plate projecting from one of the end wall or from one of the at least one sidewalls of the attachment assembly.

\* \* \* \* \*